United States Patent
Creasman et al.

(10) Patent No.: US 11,137,120 B2
(45) Date of Patent: Oct. 5, 2021

(54) MODULAR LIGHTING SYSTEM

(71) Applicant: IDEAL Industries Lighting LLC, Durham, NC (US)

(72) Inventors: Ethan Creasman, Raleigh, NC (US); Randy Bernard, Cary, NC (US); Dana Deskiewicz, Raleigh, NC (US); Nathan Snell, Raleigh, NC (US)

(73) Assignee: Ideal Industries Lighting LLC, Racine, WI (US)

( * ) Notice: Subject to any disclaimer, the term of this patent is extended or adjusted under 35 U.S.C. 154(b) by 170 days.

(21) Appl. No.: 16/101,182

(22) Filed: Aug. 10, 2018

(65) Prior Publication Data

US 2019/0003661 A1 Jan. 3, 2019

Related U.S. Application Data

(63) Continuation-in-part of application No. 15/890,272, filed on Feb. 6, 2018.

(60) Provisional application No. 62/455,422, filed on Feb. 6, 2017.

(51) Int. Cl.
| | |
|---|---|
| *F21S 2/00* | (2016.01) |
| *F21V 8/00* | (2006.01) |
| *F21V 23/00* | (2015.01) |
| *G02B 6/122* | (2006.01) |

(Continued)

(52) U.S. Cl.
CPC ............ *F21S 2/005* (2013.01); *F21V 23/007* (2013.01); *G02B 6/0075* (2013.01); *G02B 6/0078* (2013.01); *G02B 6/122* (2013.01); *H05B 45/20* (2020.01); *F21Y 2103/10* (2016.08); *G02B 6/002* (2013.01); *G02B 6/003* (2013.01);

(Continued)

(58) Field of Classification Search
CPC ........................................................ F21S 2/005
See application file for complete search history.

(56) References Cited

U.S. PATENT DOCUMENTS

| | | |
|---|---|---|
| 3,532,871 A | 10/1970 | Shipman |
| 5,613,751 A | 3/1997 | Parker et al. |
| 5,812,714 A | 9/1998 | Hulse |

(Continued)

FOREIGN PATENT DOCUMENTS

| | | |
|---|---|---|
| WO | 2014120971 A1 | 8/2014 |
| WO | 2014145283 A1 | 9/2014 |

OTHER PUBLICATIONS

Non-Final Office Action for U.S. Appl. No. 15/890,272, dated Oct. 1, 2019, 12 pages.

(Continued)

*Primary Examiner* — Sean P Gramling
(74) *Attorney, Agent, or Firm* — Withrow & Terranova, PLLC

(57) ABSTRACT

According to an aspect of this disclosure, a lighting system comprises at least first and second luminaires wherein each luminaire comprises a housing, an optical waveguide suspended from the associated housing, and one or more LEDs disposed adjacent the optical waveguide. Further in accordance with this aspect, the system comprises circuitry disposed within the housing of the first luminaire wherein the circuitry comprises LED driving circuitry and power circuitry, the power circuitry provides power to the first luminaire and at least a second luminaire, and the second luminaire is modular.

20 Claims, 16 Drawing Sheets

(51) Int. Cl.
*H05B 45/20* (2020.01)
*F21Y 103/10* (2016.01)

(52) U.S. Cl.
CPC .......... *G02B 6/0038* (2013.01); *G02B 6/0046* (2013.01); *G02B 6/0095* (2013.01)

(56) References Cited

U.S. PATENT DOCUMENTS

| | | | |
|---|---|---|---|
| 5,897,201 | A | 4/1999 | Simon |
| 7,083,313 | B2 | 8/2006 | Smith |
| 7,520,650 | B2 | 4/2009 | Smith |
| 8,430,548 | B1 | 4/2013 | Kelly et al. |
| 8,506,112 | B1 | 8/2013 | Dau et al. |
| 8,541,795 | B2 | 9/2013 | Keller et al. |
| 8,975,827 | B2 | 3/2015 | Chobot et al. |
| 9,366,799 | B2 | 6/2016 | Wilcox et al. |
| 9,581,750 | B2 | 2/2017 | Wilcox et al. |
| 9,666,744 | B2 | 5/2017 | Clements |
| 9,709,725 | B2 | 7/2017 | Wilcox et al. |
| 9,818,919 | B2 | 11/2017 | Lowes et al. |
| 9,835,317 | B2 | 12/2017 | Yuan et al. |
| 9,841,154 | B2 | 12/2017 | Sorenson et al. |
| 9,869,432 | B2 | 1/2018 | Keller et al. |
| 9,952,372 | B2 | 4/2018 | Wilcox et al. |
| 10,278,250 | B2 | 4/2019 | McBryde et al. |
| 10,379,278 | B2 | 8/2019 | Wilcox et al. |
| 10,422,939 | B2 | 9/2019 | Tarsa et al. |
| 10,502,899 | B2 | 12/2019 | Wilcox et al. |
| 2008/0037284 | A1* | 2/2008 | Rudisill .................. F21S 2/005 362/629 |
| 2012/0287671 | A1* | 11/2012 | Parker .................... F21S 2/005 362/609 |
| 2013/0208495 | A1 | 8/2013 | Dau et al. |
| 2014/0313776 | A1 | 10/2014 | Grigore |
| 2018/0224596 | A1 | 8/2018 | Creasman et al. |

OTHER PUBLICATIONS

Final Office Action for U.S. Appl. No. 15/890,272, dated Mar. 24, 2020, 13 pages.
Advisory Action for U.S. Appl. No. 15/890,272, dated Jun. 2, 2020, 3 pages.
Non-Final Office Action for U.S. Appl. No. 15/890,272, dated Jul. 2, 2020, 12 pages.
Final Office Action for U.S. Appl. No. 15/890,272, dated Dec. 14, 2020, 14 pages.
Advisory Action for U.S. Appl. No. 15/890,272, dated Feb. 12, 2021, 3 pages.
Non-Final Office Action for U.S. Appl. No. 15/890,272, dated Mar. 24, 2021, 10 pages.

* cited by examiner

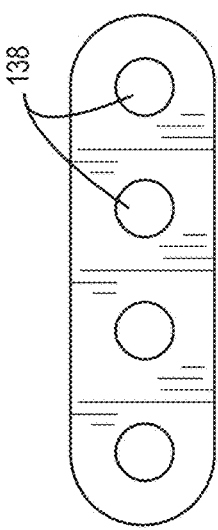
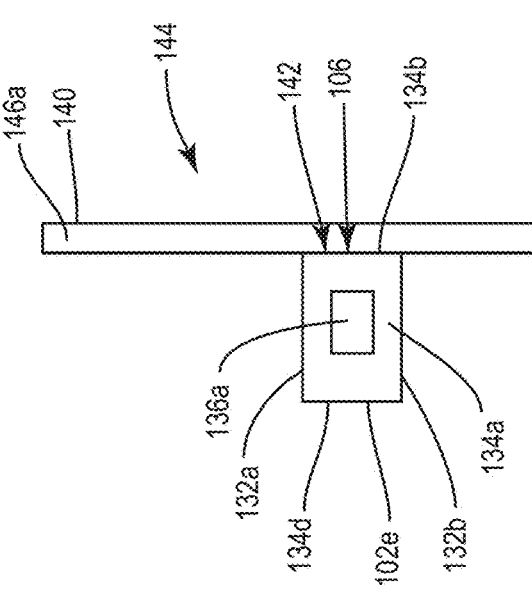
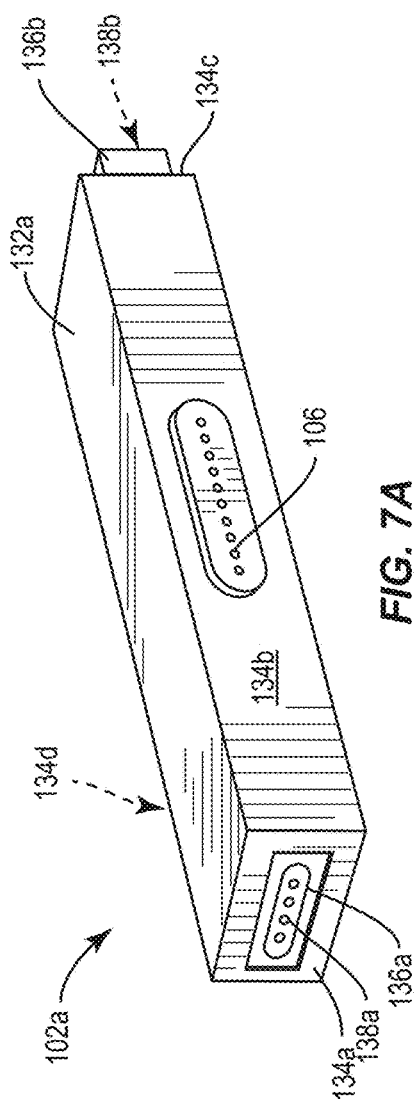
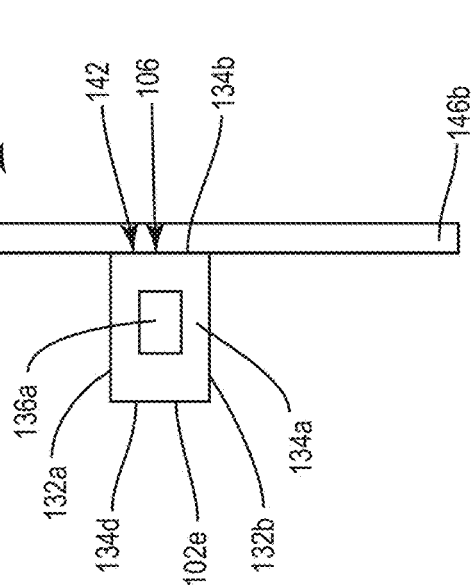

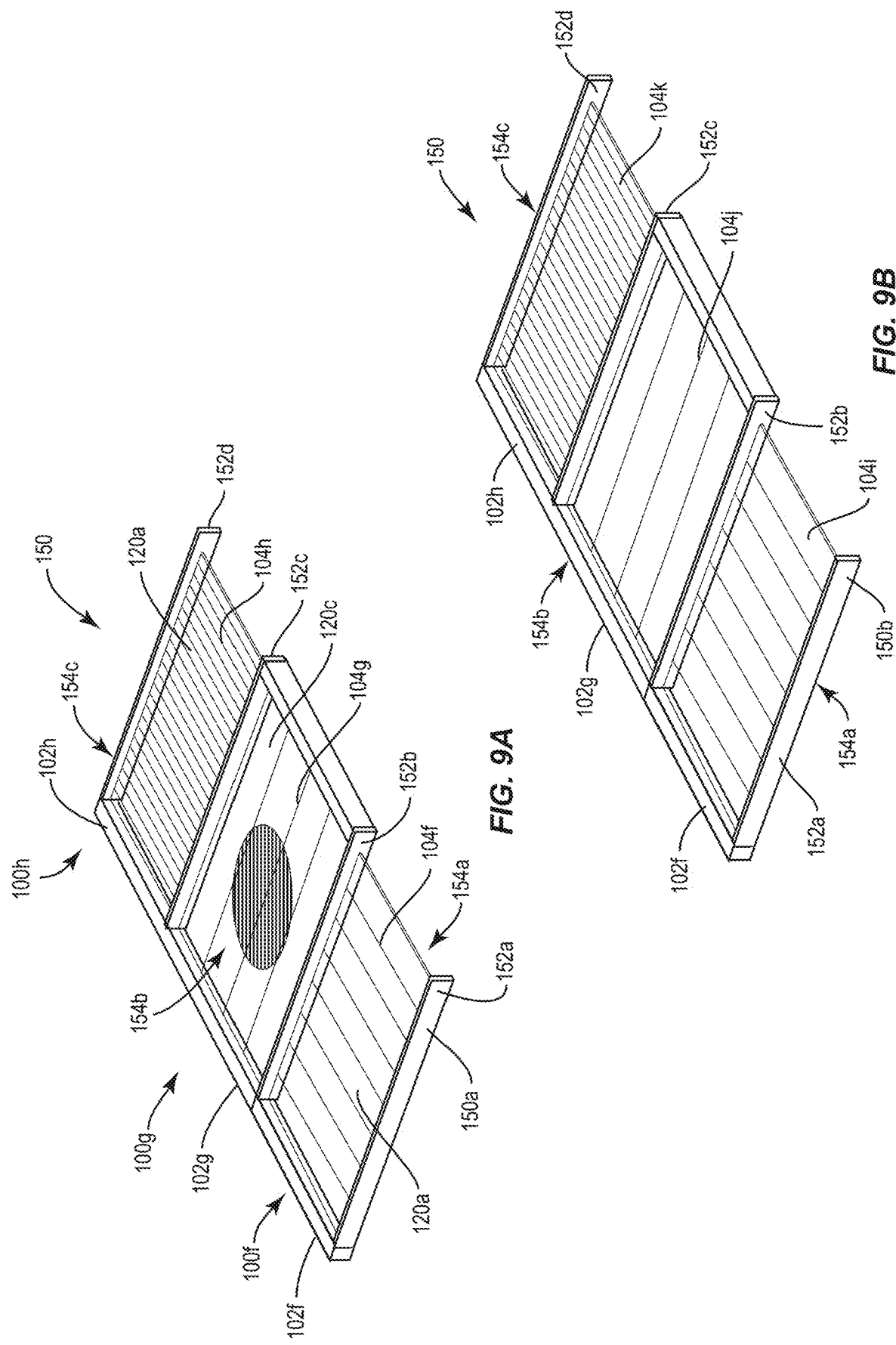

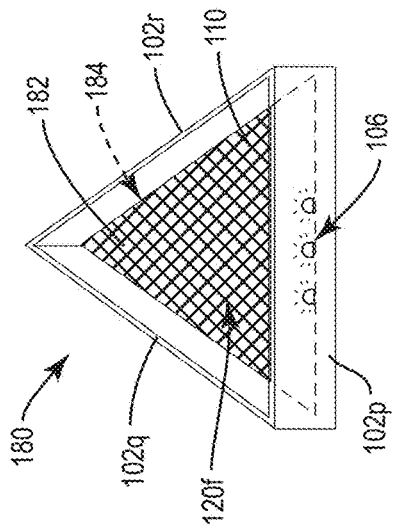
FIG. 12B
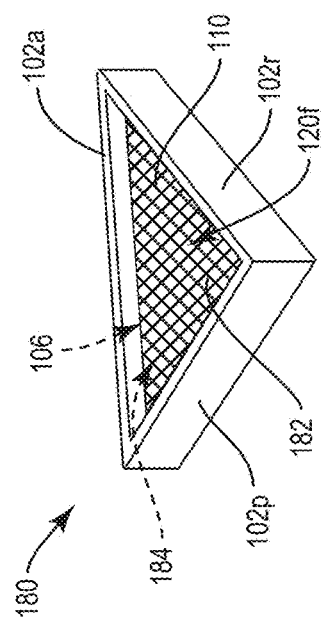
FIG. 12A
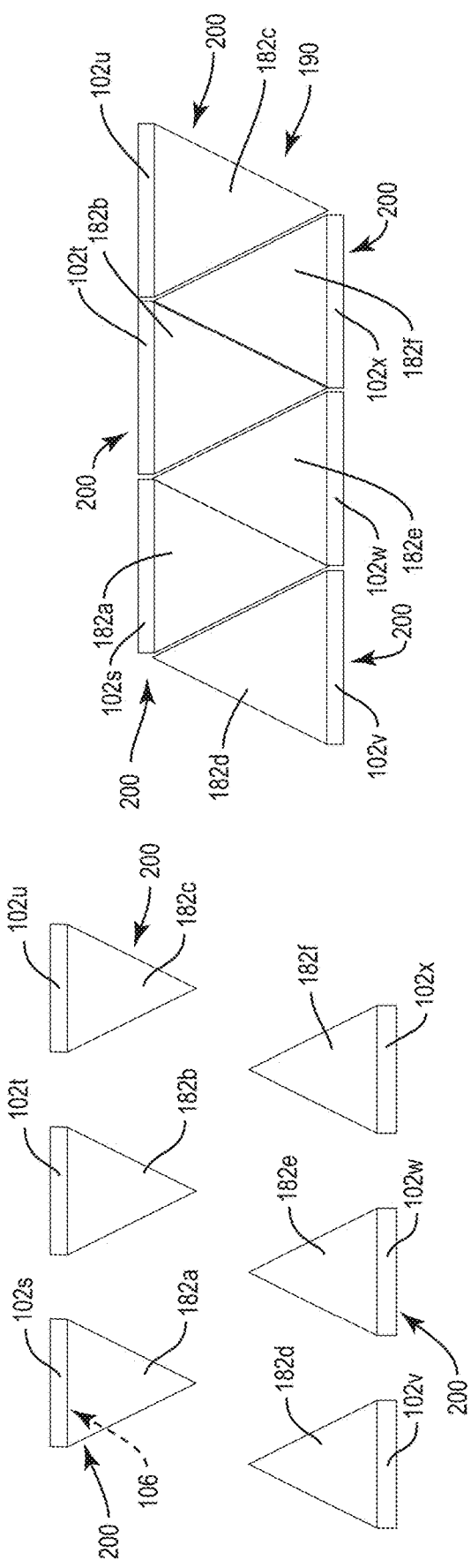
FIG. 13B
FIG. 13A

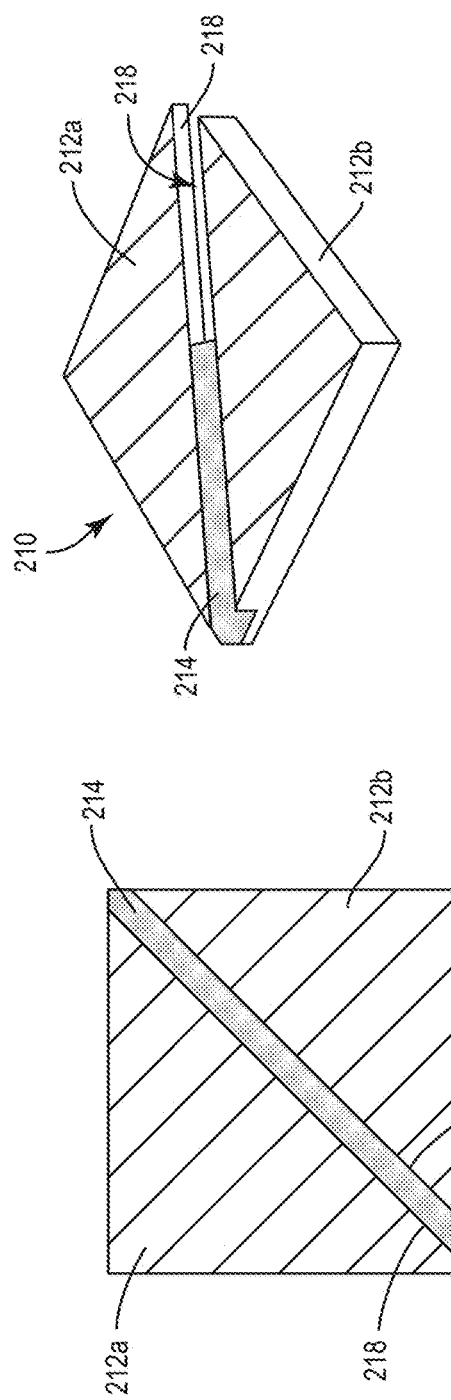
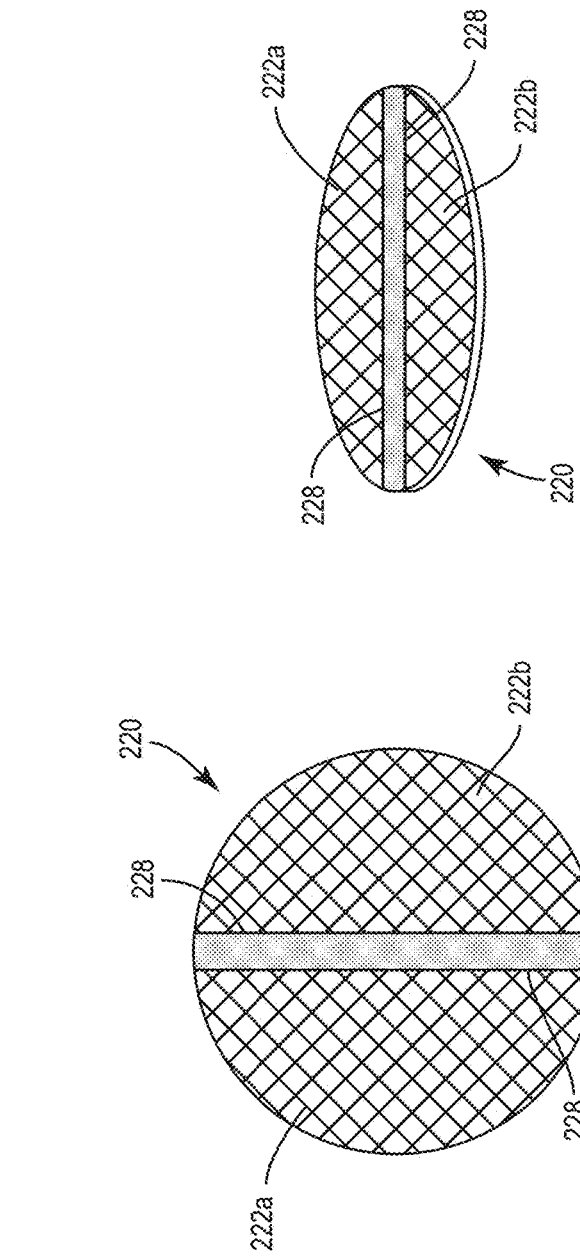
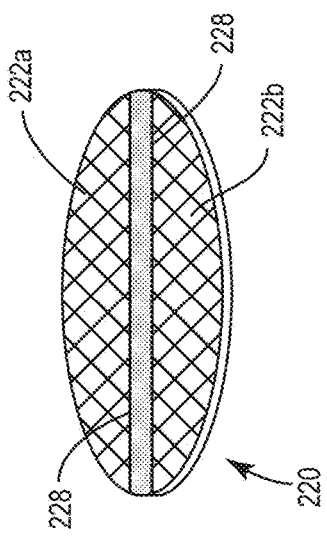
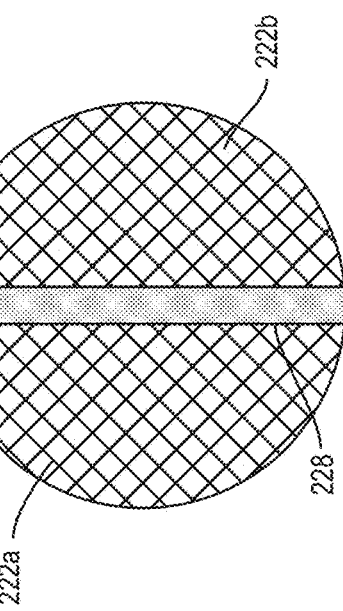
FIG. 14A
FIG. 14B
FIG. 15A
FIG. 15B

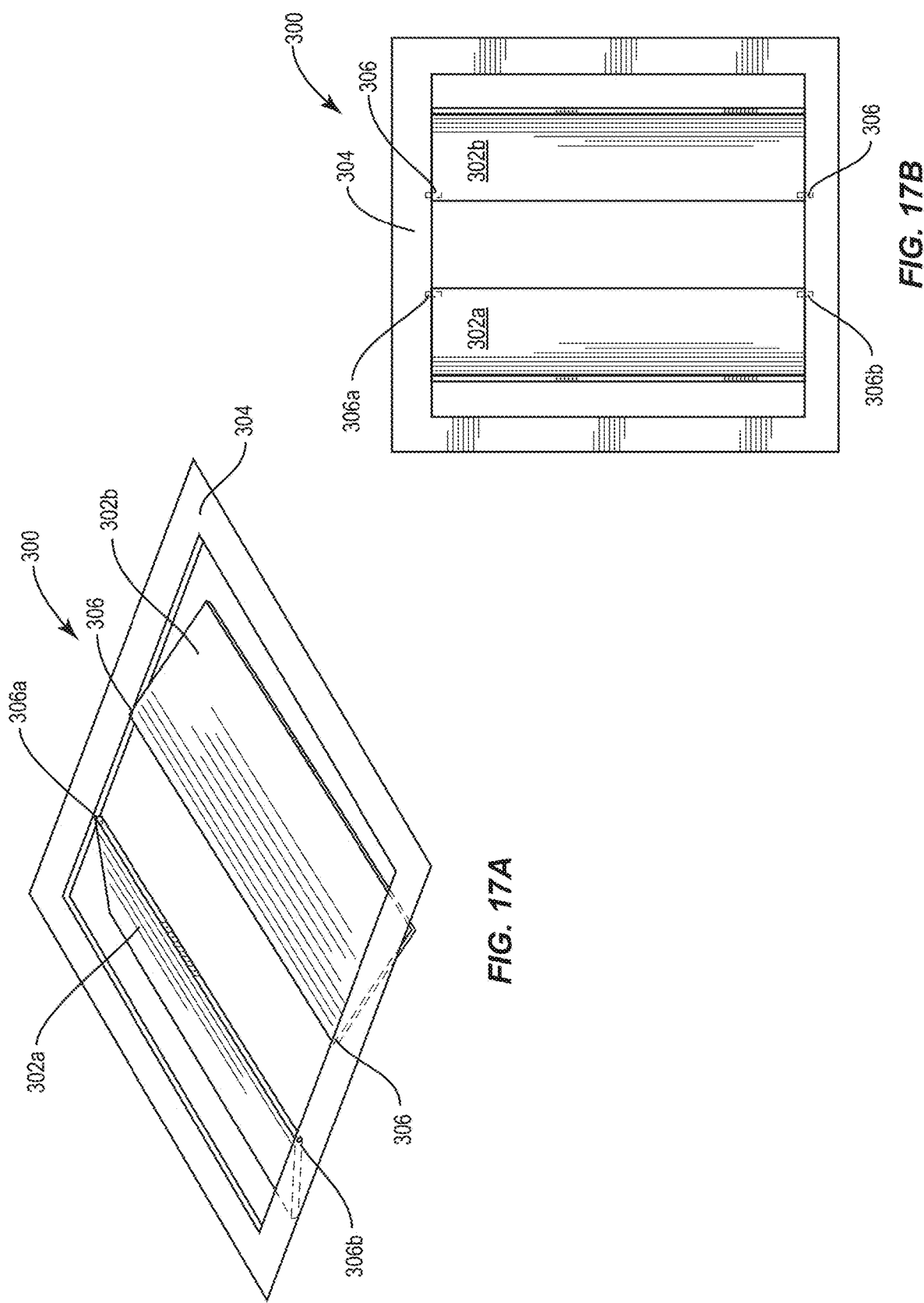

MODULAR LIGHTING SYSTEM

CROSS REFERENCE TO RELATED APPLICATIONS

The present application is a continuation-in-part of U.S. patent application Ser. No. 15/890,272, filed Feb. 6, 2018, now U.S. patent application Publication No. 2018/0224596 A1, entitled "Modular Waveguides and Fixtures Utilizing Same", which claims the benefit of U.S. Provisional Patent Application No. 62/455,422, filed Feb. 6, 2017, entitled "Modular Waveguide Fixtures", which are owned by the assignee of the present application, and the entire disclosures thereof are hereby incorporated by reference herein.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to general illumination lighting, and more particularly, to modular and/or interchangeable outdoor, indoor, and/or enclosed structure luminaires usable, for example, in home, office, or warehouse settings.

BACKGROUND

Large areas of open indoor space, such as an office or warehouse spaces, require sufficient lighting to allow for safe and comfortable activities by persons occupying or visiting the space at all times including periods when natural lighting, such as that provided by windows, is unavailable or reduced during nighttime, rainy or foggy weather conditions, or in the absence of windows. An indoor luminaire for large indoor spaces or smaller indoor spaces, such as hallways or individual office spaces, must illuminate spaces varying in size, floor plan, and intended use. It may be useful for such a luminaire to provide customizable illumination patterns in order to effectively match the light produced by the luminaire with the characteristics of the space to be illuminated. Still further, such a luminaire should be universal in the sense that the luminaire can be mounted in various enclosed and non-enclosed locations, on poles or on a surface (such as a wall or ceiling), and preferably present a uniform appearance, while further being customizable such that desired illumination patterns may be achieved along with the universal quality of such luminaire. Additionally, such a luminaire should be aesthetically pleasing, and further, versatile enough to provide illumination patterns suitable for the varied environments mentioned hereinabove.

Advances in light emitting diode (LED) technology have resulted in wide adoption of luminaires that incorporate such devices. While LEDs can be used alone to produce light without the need for supplementary optical devices, it has been found that optical modifiers, such as lenses, reflectors, optical waveguides, and combinations thereof, can significantly improve illumination distribution for particular applications.

An optical waveguide mixes and directs light emitted by one or more light sources, such as one or more LEDs. A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface. Specifically, the light rays continue to travel through the waveguide until such rays strike an index interface surface at a particular angle less than an angle measured with respect to a line normal to the surface point at which the light rays are incident (or, equivalently, until the light rays exceed an angle measured with respect to a line tangent to the surface point at which the light rays are incident) and the light rays escape.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Low-profile LED-based luminaires have recently been developed (e.g., General Electric's ET series panel troffers) that utilize a string of LED components directed into the edge of a waveguiding element (an "edge-lit" approach). However, such luminaires typically suffer from low efficiency due to losses inherent in coupling light emitted from a predominantly Lambertian emitting source such as a LED component into the narrow edge of a waveguide plane.

SUMMARY

Generally, embodiment(s) disclosed herein may include modular luminaires and customizable luminaire combinations to produce desired overall illumination patterns, modular luminaires interchangeable between one or more lighting systems/luminaires having differing configurations, and/or luminaires with portions thereof formed primarily by optical waveguides, e.g. a wall sconce where primarily only waveguides extend from the wall. Further, contemplated throughout this disclosure is modification of panel-style and/or blade-style waveguide(s) for use with luminaire configurations having different sizes, shapes, and structural elements including as modular luminaires for use in creating further customizable lighting systems/luminaires.

According to an aspect of this disclosure, a lighting system comprises at least first and second luminaires wherein each luminaire comprises a housing, an optical waveguide suspended from the associated housing, and one or more LEDs disposed adjacent the optical waveguide. Further in accordance with this aspect, the system comprises circuitry disposed within the housing of the first luminaire wherein the circuitry comprises LED driving circuitry and power circuitry, the power circuitry provides power to the first luminaire and at least a second luminaire, and the second luminaire is modular.

According to another aspect, an apparatus comprises a housing with one or more LEDs disposed therein and an optical waveguide comprising a coupling portion and a light emission portion wherein the one or more LEDs direct light into the coupling portion of the optical waveguide, and wherein the housing and the optical waveguide at least partially perform a non-lighting function.

According to a still further aspect, a lighting system comprises a plurality of optical waveguides, one or more light emitting diodes associated with each of the optical waveguides of the plurality of optical waveguides, and a housing corresponding with each of the optical waveguides of the plurality of optical waveguides wherein the one or more light emitting diodes are disposed within the housing and adjacent the associated optical waveguide. The housing associated with each of the optical waveguides is disposed along a light coupling edge of the optical waveguide, and the system further comprises a connection portion disposed along an edge of one or more optical waveguides of the plurality of optical waveguides other than the light coupling edge wherein the one or more of the plurality of optical waveguides are connectable with one another by the connection portion.

Yet another aspect contemplates a luminaire comprising a moveable optical waveguide and a housing comprising a driving circuit and one or more LEDs. The moveable optical waveguide is operatively coupled to the housing such that the LEDs direct light into the optical waveguide, and the moveable waveguide comprises at least first and second positions wherein the optical waveguide is aligned with the housing in the first position, wherein the optical waveguide extends from the housing in the second position, and wherein the optical waveguide moves from the first position to the second position within the housing.

According to another aspect, individual example lighting system/luminaire configurations may have interchangeable luminaires and/or waveguides, e.g. a wall fixture formed from four interchangeable, modular luminaires wherein each waveguide is also modular and/or interchangeable. In accordance with this aspect, the versatility and customizability of disclosed luminaire configurations, housings, and/or mountings may be increased by the interchangeability and/or modularity of the luminaires and/or the waveguides disposed therein.

In keeping with aspects of this disclosure, one or more waveguides may partially surround or cover portions of luminaire housings, e.g. one or more waveguides may be secured about a housing of a suspended fixture. Further in accordance with aspects of this disclosure, one or more luminaire(s), troffer(s), and/or wall sconce(s) may include one or more waveguide(s) disposed therein according to particular arrangements, e.g. a troffer with a blade-style or panel-style waveguide suspended vertically.

Other aspects and advantages will become apparent upon consideration of the following detailed description and the attached drawings wherein like numerals designate like structures throughout the specification.

BRIEF DESCRIPTION OF THE DRAWINGS

FIG. 7A is an isometric view of the elongate housing of the luminaire of FIGS. 1 and 6A-6D;

FIG. 7B is an elevational view of the elongate housing of the luminaire of FIG. 7B;

FIG. 7C is an elevational view of the electrical contacts of the elongate housing of FIGS. 7A and 7B;

FIG. 8 is an elevational view of the elongate housing coupled to an example optical waveguide at an interior coupling location;

FIGS. 9A and 9B are isometric views of an example luminaire comprising a plurality of optical waveguides coupled one to the next;

FIGS. 12A and 12B are isometric views from above of an example luminaire comprising one or more optical waveguides comprising generally triangular shapes;

FIG. 13A depicts a plurality of optical waveguides comprising generally triangular shapes;

FIG. 13B depicts an example luminaire comprising the plurality of optical waveguides of FIG. 13A and comprising a generally trapezoidal shape;

FIG. 14A is a plan view of an example luminaire comprising a plurality of optical waveguides each comprising a triangular shape;

FIG. 14B is an isometric view of the example luminaire of FIG. 14A;

FIG. 15A is a plan view of an example luminaire comprising a plurality of optical waveguides each comprising a generally half-circle shape;

FIG. 15B is an isometric view of the example luminaire of FIG. 15A;

FIG. 17A is an isometric view of an example luminaire with one or more moveable waveguides;

FIG. 17B is a plan view of the example luminaire of FIG. 17A;

Figure 1:
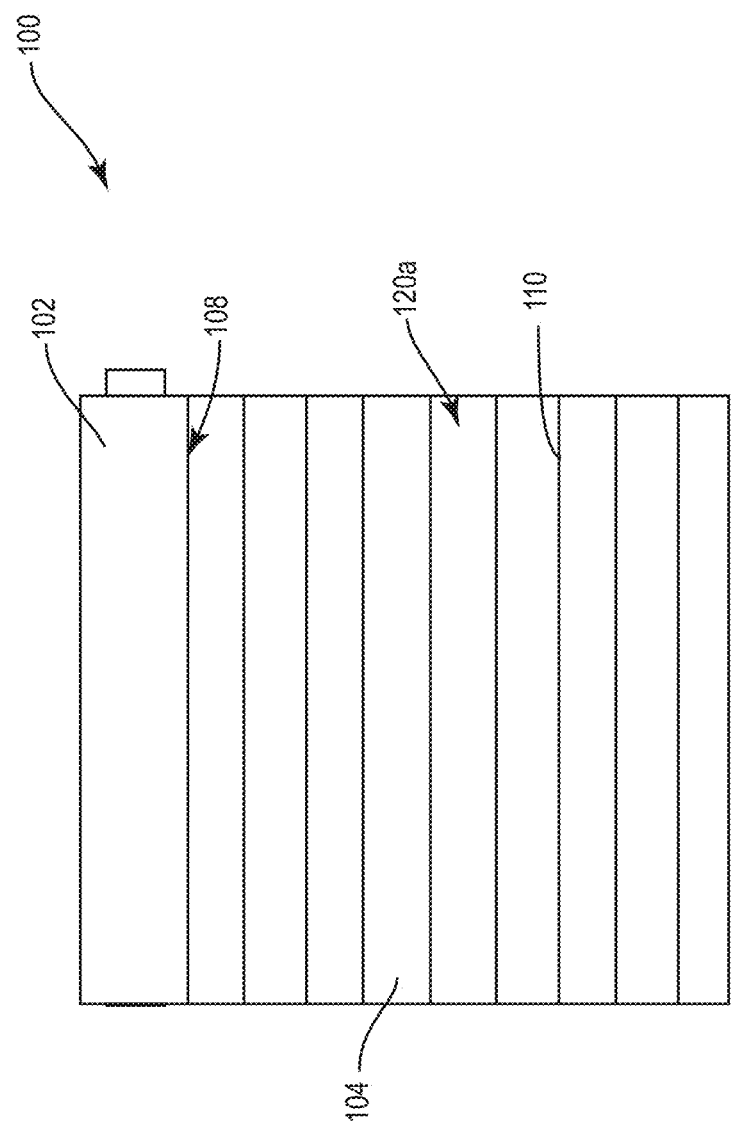
FIG. 1 is a plan view of a luminaire with an elongate housing and one or more optical waveguides suspended therefrom.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

Throughout the drawings, identical reference numbers may designate similar, but not necessarily identical, elements. Use herein of a reference numeral without an index number, where such reference numeral is referred to elsewhere with an index number, may be a general reference to the corresponding plural elements, collectively or individually.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Still further, components and processes depicted may be combined, in whole or in part, and/or divided, into one or more different parts, as applicable to fit particular implementations without departing from the scope of the present disclosure. Accordingly, the drawings and description are to be regarded as illustrative in nature and not restrictive.

As shown in the FIGS., disclosed herein are embodiments of luminaires and light fixtures for general lighting, task lighting, or the like, and more particularly, for illumination of spaces of varying size and floor plan such as a warehouse, office space, hallway, dwelling, or other space. Preferably, the space comprises an indoor space, although the luminaires disclosed herein may be used in other applications, such as an outdoor space or in a covered spaced exposed to the weather.

A luminaire 100 disclosed in FIG. 1 comprises an elongate housing 102 with one or more optical waveguide(s) 104 such as, for example, the optical waveguide 104 described hereinafter with reference to FIGS. 2-4. The luminaire 100 may be suspended from a ceiling, wall, or post, or, alternatively, may be mounted directly on a wall or post. Also in example embodiments, the luminaire 100 may be mounted or suspended from any other point of suitable structural integrity for supporting the luminaire 100. The optical waveguide(s) 104 may be suspended from and/or mounted along the elongate housing 102.

The housing 102 may include, among other things, one or more of driver circuitry, light emitting diode(s), control circuitry, sensor(s), power circuitry, circuit board(s), or other components. Furthermore, luminaires described herein may be networked with other luminaires using wired connections or wireless technology and the operation (on/off and/or color and color temperature) may be controlled as desired, for example in coordinated or stand-alone fashion. In the embodiment shown in FIG. 1, one or more LED elements or modules 106 are disposed within the housing 102 adjacent the optical waveguide 104 such that light emitted by the LEDs is coupled into an edge surface of the optical waveguide along coupling end 108 thereof, as discussed further with reference to FIGS. 2-4. The LED elements and modules 106 discussed herein throughout may be substantially the same or modified in size, shape, color, number, and/or other characteristics to fit housing and illumination specifications of particular luminaire applications/configurations described herein. The housing 102 further provides structural support to the optical waveguide 104 where said housing 102 meets the coupling end 108.

Each LED element or module 106 (shown, at least, in FIGS. 4, 7A, and 7B) may be a single white or other color LED chip or other bare component, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination with improved color rendering is to be produced, each LED element or module 106 or a plurality of such elements or modules may include one or more blue shifted yellow LEDs and one or more red LEDs. The LEDs 106 may be disposed in different configurations and/or layouts as desired. Different color temperatures and appearances could be produced using other LED combinations, as is known in the art. In one embodiment, the light source comprises any LED, for example, an MT-G LED incorporating TrueWhite® LED technology or as disclosed in U.S. patent application Ser. No. 13/649,067, filed Oct. 10, 2012, now U.S. Pat. No. 9,818,919, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, the disclosure of which is hereby incorporated by reference herein, may be utilized. In some embodiments, each LED element or module 106 may comprise one or more LEDs disposed within a coupling cavity with an air gap being disposed between the LED element or module 106 and a light input surface. In any of the embodiments disclosed herein each of the LED element(s) or module(s) 106 preferably have a lambertian or near-lambertian light distribution, although each may have a directional emission distribution (e.g., a side emitting distribution), as necessary or desirable. More generally, any lambertian, symmetric, wide angle, preferential-sided, or asymmetric beam pattern LED element(s) or module(s) may be used as the light source. Still further, any of the LED arrangements and optical elements disclosed in co-pending U.S. patent application Ser. No. 14/101,147, filed Dec. 9, 2013, now U.S. Pat. No. 9,869,432, entitled "Luminaires Using Waveguide Bodies and Optical Elements" by Keller et al., hereby incorporated by reference herein, may be used.

In general, the curvature and/or other shape of a waveguide body and/or the shape, size, and/or spacing of extraction features determine the particular light extraction distribution. All of these options affect the visual uniformity from one end of the waveguide to another. For example, a waveguide body having smooth surfaces may emit light at curved portions thereof. The sharper the curve; the more light is extracted. The extraction of light along a curve also depends on the thickness of the waveguide body. Light can travel through tight curves of a thin waveguide body without reaching the critical angle, whereas light that travels through a thick waveguide body is more likely to strike the surface at an angle that allows the light to escape. According to well-known total internal reflection (TIR) principles, light rays continue to travel through the waveguide(s) 104 until such rays strike an index interface surface at a particular angle less than an angle measured with respect to a line normal to the surface point at which the light rays are incident (or, equivalently, until the light rays exceed an angle measured with respect to a line tangent to the surface point at which the light ray is incident) and the light rays escape.

Tapering a waveguide body causes light to reflect internally along the length of the waveguide body while increasing the angle of incidence. Eventually, this light strikes one side at an angle that allows the light to escape. The opposite example, i.e., a gradually thickening waveguide body over the length thereof, causes light to collimate along the length with fewer and fewer interactions with the waveguide body surfaces. These reactions can be used to extract and control light within the waveguide. When combined with dedicated extraction features, tapering allows one to change the incident angular distribution across an array of features. This, in turn, controls how much, and in what direction light is extracted. Thus, a select combination of curves, tapered surfaces, and extraction features can achieve a desired illumination and appearance.

According to one aspect, a waveguide directs light into at least one and up to an infinite number of beams or ray groups, wherein the rays of each group travel through the waveguide within a range of angles relative to one another. Each range may be narrow or broad within the TIR limits of the waveguide material. According to another aspect, a waveguide arranges light into a plurality of groups that bounce at least once inside the waveguide by TIR off one or more surfaces of the waveguide. Each group comprises a plurality of light rays that travel at angles that are disposed within a narrow or broad range of angles relative to one another. In any embodiment, the range may be so narrow that the light rays of ray group may be considered to be fully collimated, or nearly so, or the range may be so broad that the light rays of a ray group may be considered to be anti-collimated, or nearly so. Controlling the ray angles in this manner can lead to increased light control, reduced waveguide size and weight, and reduced luminaire costs.

Each waveguide 104 (FIGS. 2-4) may have any suitable shape, and the shapes of the waveguides 104 may be different from one another or substantially or fully identical. For example, a first subset fewer than all of the waveguides 104 may be substantially or completely identical to one another, and some or all of the remaining waveguides 104 comprising a second subset may be different than the waveguides of the first subset. In this latter case, the waveguides of the second subset may be substantially or completely identical to each other or some or all may be different from one another. Any combination of substantially or completely identical and/or different waveguides 104 that develop identical or different light illumination distributions is contemplated. Also, although one, two, three, four, and six waveguides 104 are illustrated in the FIGS., a different number of waveguides could be used, as noted in greater detail hereinafter.

In some embodiments, two or more waveguides may be disposed at an angle α relative to one another. In one such embodiment, the angle α may be approximately 90 degrees. In another embodiment, the angle α may be greater or less than 90 degrees to produce a desired distribution. In some embodiments, the waveguides may be arranged in a straight line, or may be arranged in a non-linear open or closed path. Still further, the material(s) of the waveguides 104 preferably comprise optical grade materials that exhibit TIR characteristics including, but not limited to, one or more of acrylic, air, polycarbonate, molded silicone, glass, and/or cyclic olefin copolymers, and combinations thereof, possibly in a layered arrangement, to achieve a desired effect and/or appearance. Preferably, although not necessarily, the waveguides 104 are all solid or some or all have one or more voids or discrete bodies of differing materials therein. The waveguides 104 may be fabricated using procedures such as hot embossing or molding, including injection/compression molding. Other manufacturing methods may be used as desired.

Figure 2:
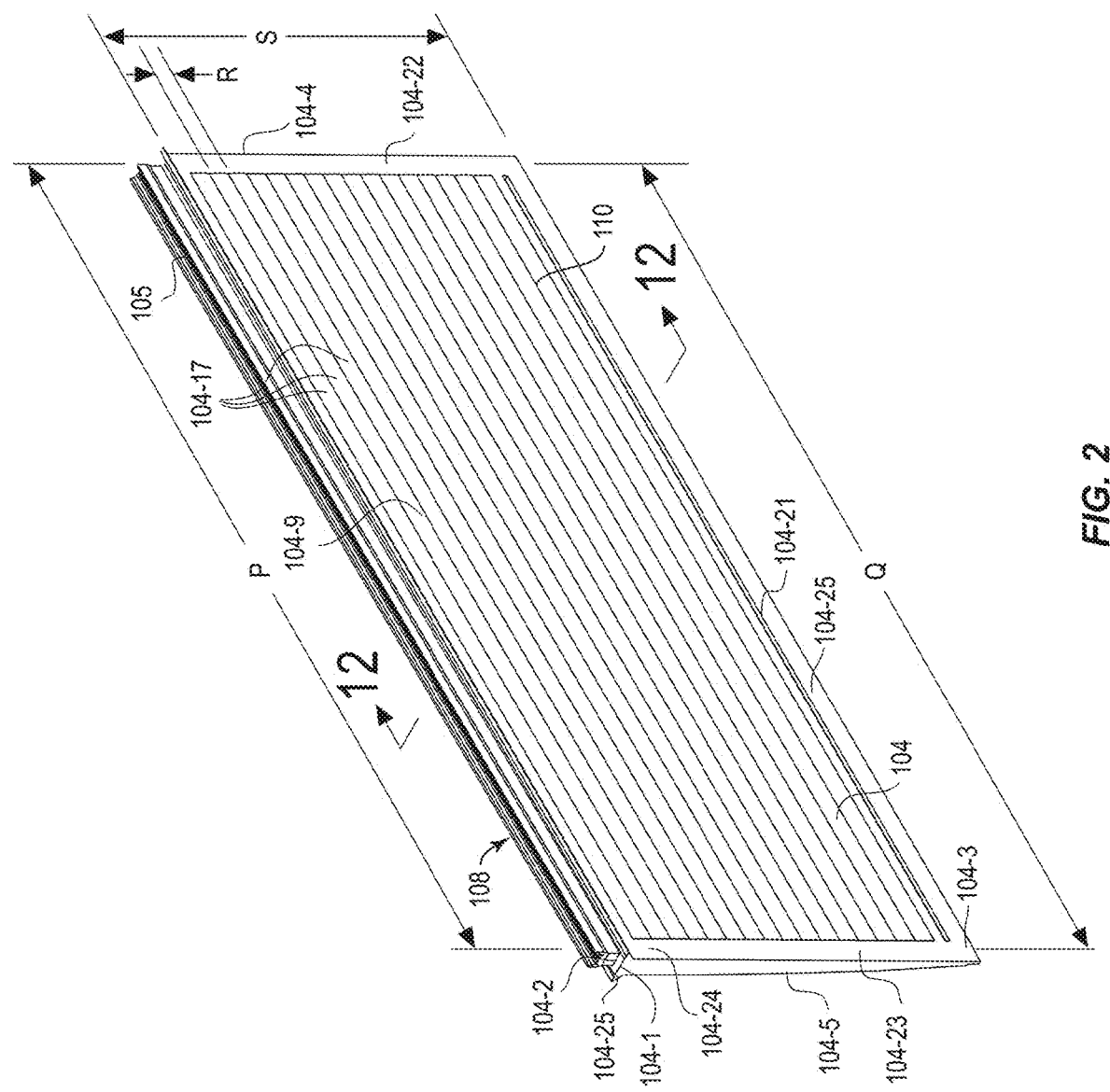
FIG. 2 is an isometric front view of an example of the optical waveguide(s) and coupling member(s) of the luminaire of FIG. 1.

FIG. 2 illustrates an example waveguide, of the waveguide(s) 104 that includes an enlarged tapered portion 104-1 adjacent a first or top end 104-2. The waveguide 104 further includes a second or bottom end 104-3 and side edge portions 104-4 and 104-5. Referring to FIG. 4, a light emitting portion 104-6 is disposed between the portion 104-1 and end 104-3. The light emitting portion 104-6 includes a plurality of light extraction features 110 disposed on or in a first or rear surface 104-8 opposite a second or front surface 104-9. It should be noted that the light extraction features 110 may be irregularly spaced or some may be regularly spaced and others irregularly spaced, etc. In the illustrated embodiment, the plurality of light extraction features 110 includes a first set of features 104-10 (FIG. 4) that are relatively large and widely spaced and disposed at an upper portion of the waveguide 104 relatively nearer the tapered portion 104-1. Each of the extraction features 104-10 may be generally of the shape disclosed in International Application Serial No. PCT/US14/13937, filed Jan. 30, 2014, entitled "Optical Waveguide Bodies and Luminaires Utilizing Same", owned by the assignee of the present application and the disclosure of which is hereby incorporated by reference herein. As seen in FIG. 4, each feature 104-10 comprises an elongate wedge-shaped channel or groove 104-11 disposed adjacent an elongate wedge-shaped ridge or protrusion 104-12, both of which preferably extend partially between the side edge portions 104-4 and 104-5 transversely (preferably, although not necessarily, perpendicularly) with respect thereto. The wedge-shaped channel 104-11 includes an extraction surface formed at an angle relative to the rear surface 104-8. The angle may be constant, vary throughout the length of the extraction feature 104-10, vary throughout the group of extraction features 104-10, and/or vary throughout the groups of extraction features 104-10, 104-13, 104-14, and/or 104-15 described below. In some embodiments, the angle varies between about 25° and about 40°. Also preferably, although not necessarily, the channels and ridges of each feature 104-10 are parallel to each other and to other channels and ridges of other features 104-10.

The remaining waveguides 104 (including, for example, waveguides 104, 140, 172, 182, 212, 302, 312, 318) described herein throughout may include corresponding elements/extraction features that are substantially similar or identical to the elements 104-1 through 104-25. In at least the illustrated embodiment(s) of FIGS. 6A, 6B, 9A, 9B, 16A, and 16B, the waveguides are all disposed at the same, or substantially the same, elevation in the luminaire 100, although this need not be the case.

Figure 5A:
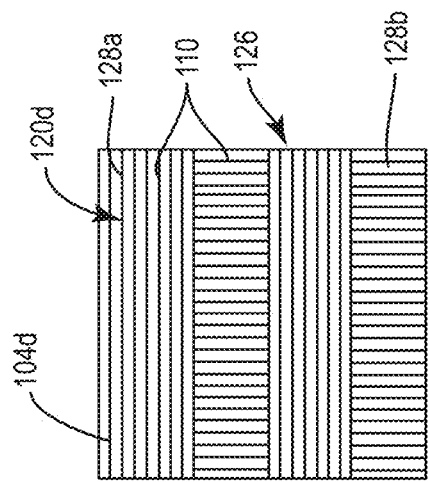
FIGS. 5A-5C are plan views of example optical waveguides comprising differing extraction feature patterns.
Figure 5B:
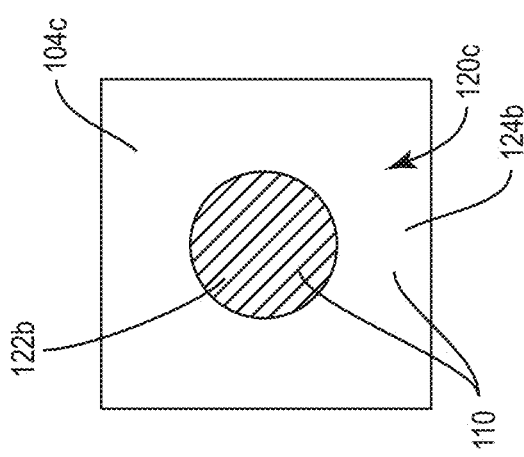
Figure 5C:
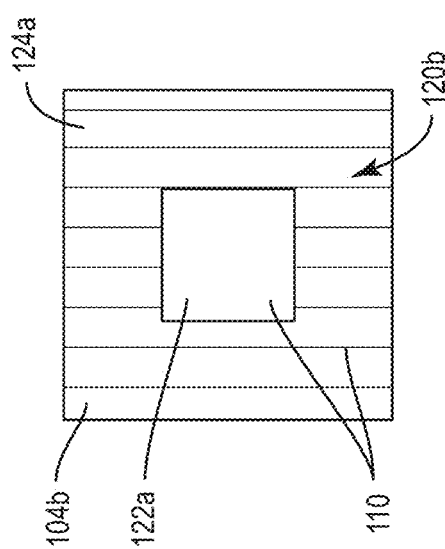

Referring now to FIGS. 5A-5C, embodiments of the one or more waveguide(s) 104 are shown with arrangements for the light emitting portion 104-6 varying therebetween. In these FIGS., the plurality of light extraction features 110 are configured to produce different illumination patterns, and the waveguide(s) 104 are depicted in side elevation as if mounted such that said waveguide(s) 104 are suspended vertically parallel to a wall (the same view images may depict a plan view, if the luminaire(s) 100 associated therewith are mounted such that said waveguide(s) 104 project horizontally perpendicular to a wall). In example embodiments, the plurality of light extraction features may be configured to develop an illumination distribution having a different directional component or no directional component. A pattern 120b of light extraction features 110 depicted on a waveguide 104b (of the waveguide(s) 104) of FIG. 5A includes an interior portion 122a (shown here as generally square in shape) that develops directionally downward lighting, such as might be suitable for direct or task lighting, while an exterior portion 124a develops an illumination pattern for general lighting. The illumination pattern of the exterior portion 124a may direct light mostly upwards and with a wide distribution, such as might be suitable for illuminating an open indoor space such as an office, warehouse, or other enclosed space.

FIG. 5B depicts the waveguide 104c (of the waveguide(s) 104) with a pattern 120c of light extraction features 110 for developing an illumination pattern similar to that produced by FIG. 5A. The extraction feature pattern 120c illustrated in FIG. 5B may direct light relatively more light directionally downward by interior portion 122b (shown here as generally circular in shape), such as might be suitable for spotlighting or task lighting, while an exterior portion 124b develops an illumination pattern for general lighting, as described earlier with respect to FIG. 5A.

A waveguide 104d (of the waveguide(s) 104) in FIG. 5C has disposed thereon a pattern 120d of light extraction features 110 for developing pathway or hallway lighting. The pattern 120d shown in FIG. 5C includes a middle portion 126 as well as first and second outer portions 128a, 128b. The middle portion 126 may direct light in a relatively downward direction with a relatively broad horizontal distribution, such as might be suitable for illuminating a walkway situated beneath and in front of the vertically suspended waveguide 104d. The first and second outer portions 128a, 128b may direct light towards a wall disposed on the opposite side of a pathway relative a wall wherefrom the waveguide 104d is mounted/suspended, according to the particular luminaire configuration of which the waveguide is a component. Alternatively, the first and second outer portions 128a, 128b may direct light relatively upwards and outwards such as might be suitable to develop indirect lighting for a general illumination pattern.

Referring once again to FIG. 1, the waveguide 104 depicted therein comprises an extraction feature pattern 120a of light extraction features 110 for developing an illumination pattern for general lighting. The general lighting pattern produced by the extraction feature pattern 120a in FIG. 1 directs light relatively more horizontally outward into an open indoor space, but may also direct some light in a relatively upwards direction to provide indirect lighting of the room or enclosed space being illuminated.

The optical waveguide(s) 104 may have features disposed thereon for extracting light, as discussed with respect to FIGS. 2-4 hereinabove, such that, for example, an illumination pattern wherein about eighty percent of light is emitted downwards from a lower surface thereof, and about twenty percent of light is emitted upwards from an upper surface. Alternatively, the ratio of light emitted out of the lower and upper surfaces, respectively, may be customized for each of the optical waveguide(s) in order to produce an overall illumination pattern for the luminaire(s) and lighting system/luminaires described herein, depending on the needs of a particular application or setting.

In a further alternative, the optical waveguide(s) 104 may have an arrangement of features disposed on the lower and upper surfaces thereof, such that, for example, the downward emitted light is distributed according to a directional pattern. Specifically, the downward light emitted from the lower surface of the optical waveguide(s) 104 may be directed straight down, outward, and away from the luminaire 100 and elongated housing 102, or concentrated downward such was for a task lighting, workstation lighting, and/or spotlighting illumination pattern. Again, the directional component of light emitted from the optical waveguide(s) 104 may be customized for each optical waveguide 104 in order to produce an overall illumination pattern for the luminaire(s) 100 and/or lighting system/luminaire(s) that is desired for a particular application or setting.

The waveguide(s) 104, comprising any one of the light extraction feature patterns 120a, 120b, 120c, 120d detailed with reference to FIGS. 1 and 5A-5C, may be suspended from the elongate housing 102 described with reference to the luminaire 100 depicted in FIG. 1. Additionally, the waveguide(s) 100 may be interchangeably configured with any of the extraction feature patterns 120a-d and/or other suitable light extraction feature patterns for producing illumination patterns desirable for particular lighting applications.

Figure 6A:
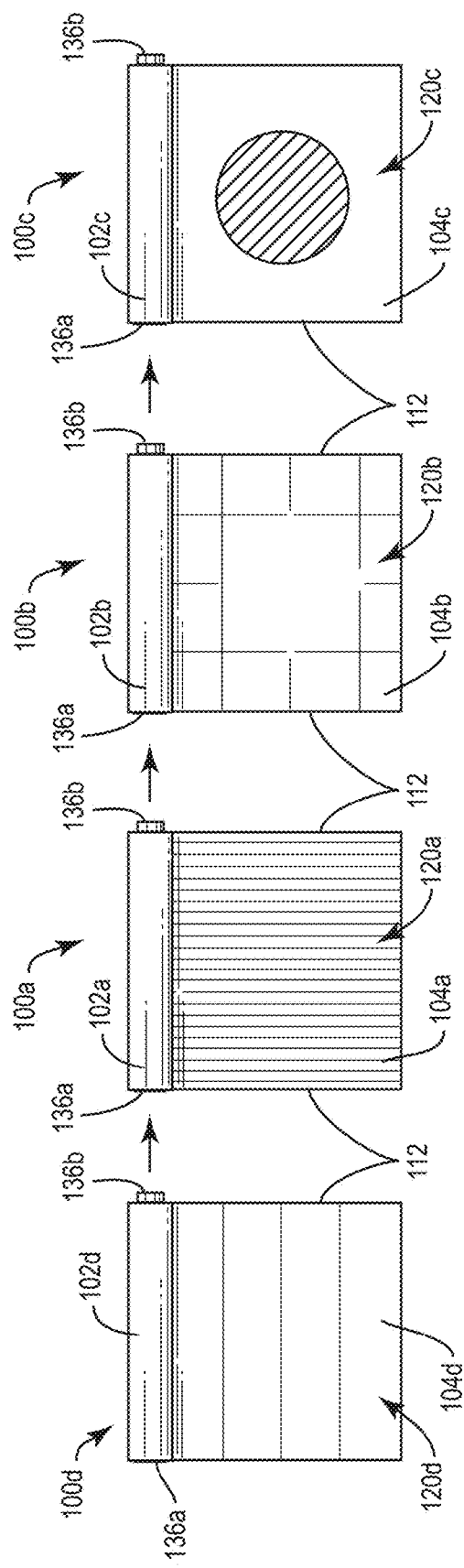
FIGS. 6A and 6B are plan views of example luminaires, similar to the luminaire of FIG. 1, comprising differing extraction feature patterns, exploded and combined as a lighting system, respectively.
Figure 6B:
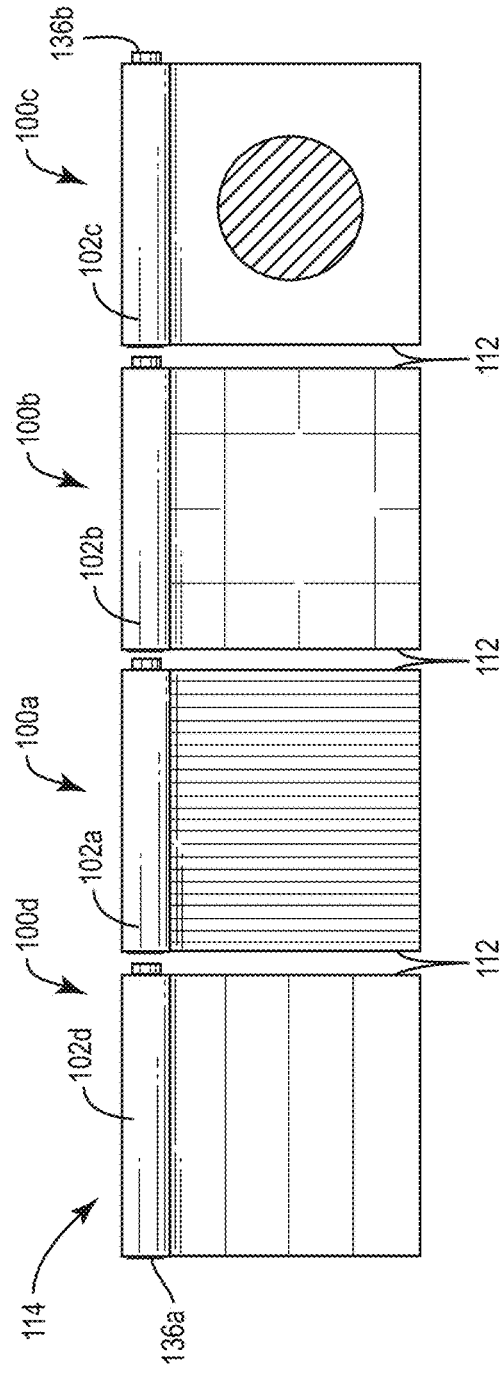

FIG. 6A illustrates the example luminaires 100a-d comprising elongate housings 102a-d and optical waveguides 104 with the extraction feature patterns shown in FIGS. 1 and 5A-5C. The luminaire 100a is substantially the same as the luminaire 100 depicted in FIG. 1. Arrows depict coupling of one elongate housing to the next and, thereby, one luminaire to the next. Further, the waveguides 104a-d may couple one to the next along edge surfaces 112 thereof. The luminaires 100a-100d may be modular and interchangeable. Referring now to FIG. 6B, a lighting system/luminaire 114 is formed by the coupled modular luminaires 100a-100d. The modular luminaires 100a-100d may be decoupled, rearranged, and re-coupled, in any desirable order. Further, contemplated embodiments of the lighting system/luminaire 114 are not limited to four modular luminaires but, instead, may comprise any more or fewer modular luminaires selectable to fit the specifications of particular lighting applications.

Moreover, one or more of the optical waveguides 104 may develop an illumination distribution having a directional lighting component while one or more other of the optical waveguides 104 may develop an illumination distribution having a different directional component or no directional component. By way of further example, waveguides 104a, 104b, 104c, 104d disposed, respectively, on the elongate housings 102a, 102b, 120c, 102d of the lighting system/luminaire 114 may develop directional components for lighting workstations under any of the modular luminaires 100a-d that form the lighting system/luminaire 114. In still another example, the lighting system/luminaire 114 may be mounted and/or suspended from a ceiling (not shown).

Given that each optical waveguide 104a-d of the lighting system/luminaire 114 may produce any customizable illumination pattern and that each luminaire 100a, 100b, 100c, 100d is modular, such modular luminaires 100a-d may be easily interchanged and selected to produce customizable overall illumination patterns for the lighting system/luminaire 114 according to parameters suitable for a given indoor lighting application or simply according to desired characteristics. Still further, the optical waveguides 104a, 104b, 104c, 104d may also be modular and interchangeable as described in previously-incorporated U.S. patent application Ser. No. 15/890,272, filed Feb. 6, 2018, now U.S. Patent Application Publication No. 2018/0224596 A1, entitled "Modular Waveguides and Fixtures Utilizing Same".

As discussed hereinabove with reference to the embodiments of FIGS. 1-6B, an illumination pattern developed by the lighting system/luminaire 114 may be customized. The optical waveguides 104a-d include on left and/or right sides thereof the extraction features 110 having one or more of the characteristics discussed with reference to FIGS. 2-4 for developing desired distributions of emitted light. For example the lighting system/luminaire 114 may develop an illumination pattern such that a ratio of emitted light may be one-to-one for the left and right/upper and lower sides of the optical waveguide(s) 104a-d. Other lighting parameters may be similarly customized between the left and right/upper and lower sides according to desired characteristics such as intensity, illumination pattern, directionality, etc. Additionally, the optical waveguide(s) 104a-d may emit substantially collimated light in selected directions, such as, for example, at thirty degrees or forty-five degrees downward and away from the lighting system/luminaire 114 (when mounted perpendicular to a wall) in order to create a desired lighting distribution and/or directionality pattern.

Furthermore, the optical waveguide(s) 104a-d may have the same or different emission patterns. Furthermore, the optical waveguides 104a-d may have the same or different emission patterns having one or more directional components. By way of further examples, the lighting system/luminaire 114 may be configured such that each of the individual optical waveguides 104a-d has a different light emission pattern from all other waveguides, each of some of the waveguides (e.g., every other of the individual optical waveguides 104a, c) has a first light emission pattern while each of one or more of the remaining waveguides 104b, d has a second light emission pattern different than the first light emission pattern, or only one of the optical waveguides 104a-d has a different light emission pattern relative to the other optical waveguides 104a-d. In a specific example, it may be desirable for the optical waveguides 104c, 104d on either end of the lighting system/luminaire 114 to direct light relatively more horizontally outward from the luminaire, while the interior optical waveguides 104a, 104b direct light relatively more downward and below the lighting system/luminaire 114. Such a configuration of optical waveguides may form a desirable illumination pattern for lighting an open indoor/outdoor/enclosed space such as an office or warehouse while also adequately lighting the floor immediately underneath the modular lighting system/luminaire 114.

As with other embodiments described herein throughout, the optical waveguides 104a-104d in combination with the elongate housings 102a-102d comprise modular luminaires 100a-100d, which are modular and interchangeable, such that one may be switched for another and/or such that the luminaires 100a-100d may be replaced with relative ease. Given that each optical waveguide 104a-d of the lighting system/luminaire 114 may produce any customizable illumination pattern and that each luminaire 100a-d is modular, such luminaires may be easily interchanged and selected to produce customizable overall illumination patterns for the lighting system/luminaire 114 according to parameters suitable for a given indoor/outdoor/enclosed lighting application or simply according to the desired characteristics.

The elongate housings 102a, 102b, 102c, 102d (FIGS. 6A and 6B) are substantially identical to one another and, therefore, only the elongate housing 102a will be described and shown in detail with reference to FIGS. 7A-7C. FIG. 7A is an isometric view of the example elongate housing 102a. The elongate housing 102a may include, among other things, one or more of driver circuitry, light emitting diode(s), control circuitry, sensor(s), power circuitry, circuit board(s), and/or other components. These components are disposed between upper and lower housing portions 132a, 132b. Sidewalls 134a, 134b, 134c, 134d are disposed between the upper and lower housing portions 132a, 132b. The elongate housing 102a comprises the one or more LED elements or modules 106, as discussed hereinabove, disposed on one or more printed circuit boards (PCBs) and arranged to direct light into the coupling end(s) 108 of the optical waveguide(s) 104.

Further, each optical waveguide(s) 104 is supported by components of the housing 102a and coupled to the LED elements or modules 106 in substantially identical fashion, save relative location. Also, the optical waveguides 104 are preferably identical to one another (except possibly the size, placement, and/or arrangement of optical features, such as extraction features), and therefore interchangeable and/or modular. For example, one or more replacement optical waveguides (not shown) may be inserted into the luminaire 112 upon removal of one or more of the optical waveguides 104 shown in the example lighting system/luminaire 114 of FIG. 6B. Further, one or more replacement luminaire (not shown) may be inserted into the lighting system/luminaire 114 upon removal of one or more of the luminaires 100 shown in the example lighting system/luminaire 114 of FIG. 6B because the luminaires 100 may be modular, interchangeable, and/or replaceable.

Figure 3:
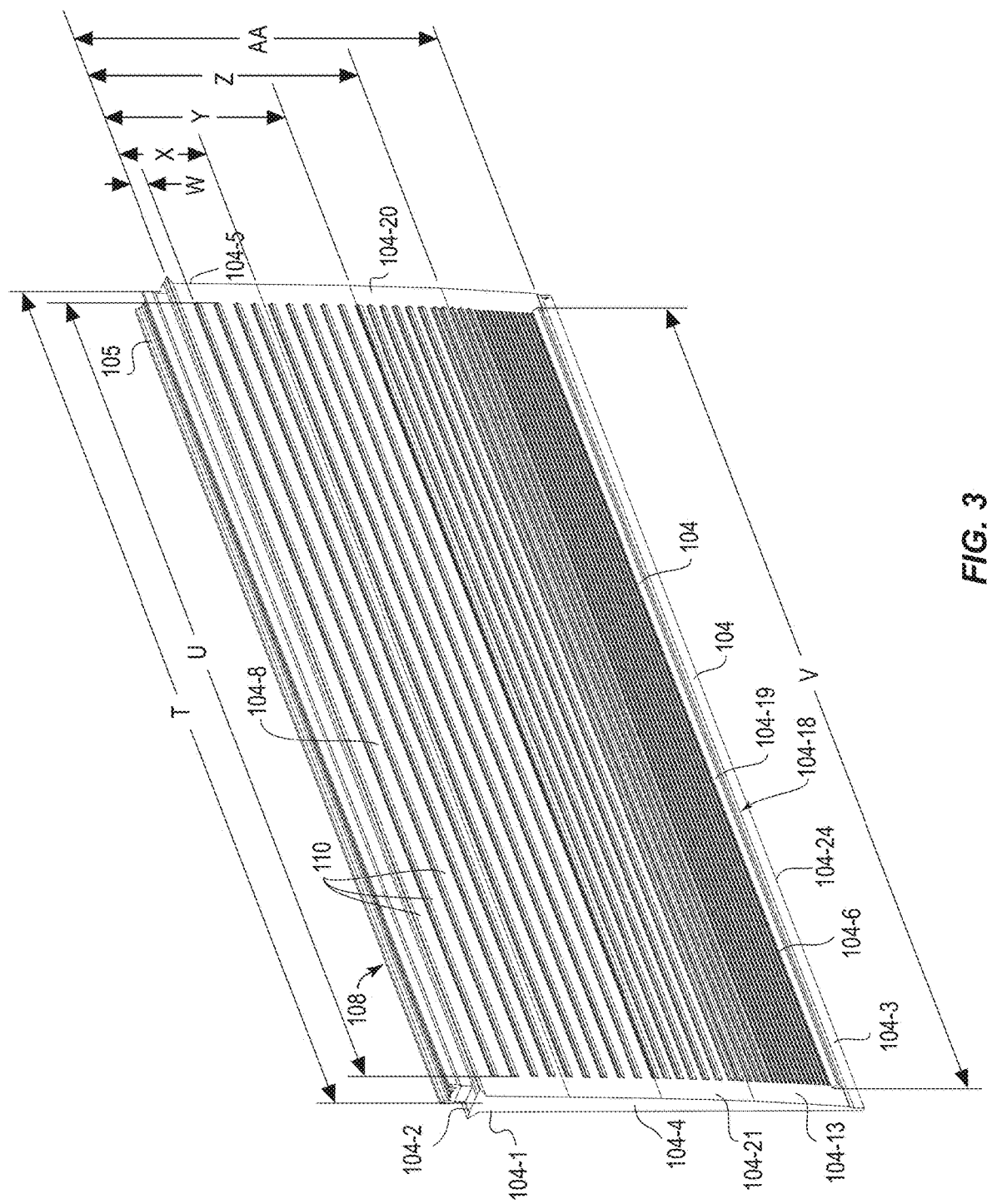
FIG. 3 is an isometric rear view of the optical waveguide and coupling member of FIG. 2.
Figure 4:
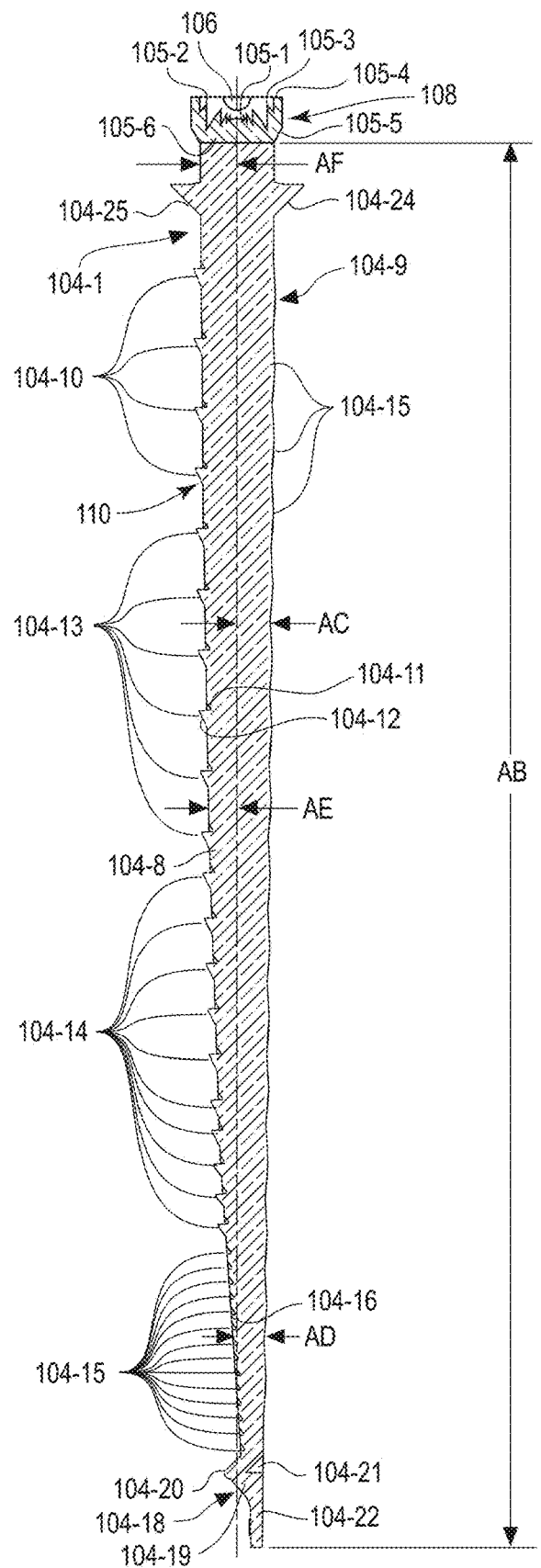
FIG. 4 is a sectional view taken generally along the lines 4-4 of FIG. 2.

Referring once again to the waveguide embodiment shown in FIGS. 2-4, an optical coupling member 105 is disposed at a coupling end 108 of the waveguide 104. The material of the optical coupling member 105 is preferably somewhat sticky so that a planar bottom surface 105-6 of the member 105 adheres to and forms an optically transmissive bond with a planar top end 104-2 of the waveguide 104. In another embodiment, the optical coupling member 105 may comprise an acrylic material such as poly(methyl methacrylate) (PMMA) that is overmolded onto or otherwise optically coupled to the acrylic waveguide 104 during fabrication. In a further embodiment, the optical coupling member 105 and the waveguide 104 may be fabricated as a unitary piece of a single material using procedures such as hot embossing or molding, including injection/compression molding, or other suitable methods. Further, a tapered outer surface 105-5 preferably, but not necessarily, contacts a rigid electrically conductive member comprising a printed circuit board (PCB), and/or a flexible circuit element (not shown) carrying the LED element or module 106 when the optical coupling member 105 is fully inserted into a coupling position (FIGS. 1, 6A, and 6B).

Still further, any of the mechanical structures, LED arrangements, circuits, and optical elements disclosed in U.S. patent application Ser. No. 14/671,512, filed Mar. 27, 2015, now U.S. Pat. No. 9,858,750, entitled "Outdoor and/or Enclosed Structure LED Luminaire" by Wilcox et al., U.S. patent application Ser. No. 14/583,415, filed Dec. 26, 2014, now U.S. Pat. No. 10,502,899, entitled "Outdoor and/or Enclosed Structure LED Luminaire" by Wilcox et al., and/or U.S. patent application Ser. No. 14/462,426, filed Aug. 18, 2014, now U.S. Pat. No. 10,379,278, entitled "Outdoor and/or Enclosed Structure LED Luminaire for General Illumination Application, Such as Parking Lots and Structures" by Wilcox et al., all of which are hereby incorporated by reference herein, may be used. Additionally, any of the mechanical structures, LED arrangements, circuits, and optical elements disclosed in International Application No. PCT/US2014/30017, filed Mar. 15, 2014, entitled "Optical Waveguide Body", U.S. patent application Ser. No. 14/485,609, filed Sep. 12, 2014, now U.S. Pat. No. 9,952,372, entitled "Luminaire Utilizing Waveguide", U.S. Provisional Patent Application No. 62/005,965, filed May 30, 2014, entitled "Luminaire Utilizing Waveguide", U.S. Provisional Patent Application No. 62/025,436, filed Jul. 16, 2014, entitled "Luminaire Utilizing Waveguide", U.S. Provisional Patent Application No. 62/025,905, filed Jul. 17, 2014, entitled "Luminaire Utilizing Waveguide", U.S. patent application Ser. No. 14/657,988, filed Mar. 13, 2015, now U.S. Pat. No. 9,709,725, entitled "Luminaire Utilizing Waveguide", U.S. patent application Ser. No. 15/060,354, filed Mar. 3, 2016, now U.S. Pat. No. 9,835,317, entitled "Luminaire Utilizing Waveguide", U.S. patent application Ser. No. 15/060,306, filed Mar. 3, 2016, now U.S. Pat. No. 9,841,154, entitled "Luminaire Utilizing Light Emitting Diodes", U.S. Provisional Patent Application No. 62/301,559, filed Feb. 29, 2016, entitled "Luminaire Utilizing Waveguide", U.S. Provisional Patent Application No. 62/301,572, filed Feb. 29, 2016, entitled "Luminaire Utilizing Light Emitting Diodes", U.S. Pat. No. 9,366,799, issued Jun. 14, 2016, entitled "Optical Waveguide Bodies and Luminaires Utilizing Same", and U.S. patent application Ser. No. 15/277,670, filed Sep. 27, 2016, now U.S. Pat. No. 10,422,939, entitled "Waveguide Having Unidirectional Illuminance" all owned by the assignee of the present application and the disclosures of which are incorporated by reference herein.

Referring still to FIGS. 7A and 7B, first and second power ports 136a, 136b are disposed on the end sidewalls 134a, 134c. The power ports 136a, 136b may comprise a keying shape and/or otherwise fit together suitably. The first power port 136a may be a female power port while the second power port 136b may be a male power port. The male power port 136b fits partially into the female power port 136a so as to complete an electrical connection between first and second individual housings of the elongate housings 102. Referring once again to FIG. 6A, the arrows therein indicate the male power ports 136b of the elongate housings 102a-c directed into the corresponding female power ports 136a of the next elongate housings 102b-d. For example, the male housing 136b of the first elongate housing 102a follows the arrow to insertion and coupling with the female housing 136a of the elongate housing 102b. Accordingly, the first and second luminaires 100a, 100b may be physically and electrically coupled by the male and female power ports 136b, 136a.

Referring also now to FIG. 7C, one or more electrical contacts 138 may be disposed in and/or on the power ports 136a, 136b. Electrical contact(s) 138b disposed on the male power ports 136b may align and contact electrical contacts 138a disposed within the female power ports 136a. When the electrical contacts 138a, 138b contact one another electrical power is conducted from the first elongate housing 102a to the second elongate housing 102b. Accordingly, the first luminaire 100a transfers power to the second luminaire 100b. The electrical contact(s) 138 may further provide for transfer of control signals. Also in example embodiments, the power port(s) 136 may provide a controls connection that is spaced apart from and/or separate from the electrical contacts 138. Also shown in FIGS. 7A and 7B, the elongate housing 102 has disposed along at least the sidewall 134b, whereto the optical waveguide 104 may be attached, the LED element(s) and/or module(s) 106, such that the coupling portion 108 of the optical waveguide 104 aligns with the LEDs 106.

With further reference to FIGS. 7A and 7B, the elongate housing 102 may be formed from plastic, glass, metal, or some combination thereof. For example, the housing 102 may be fabricated from a single extrusion of one or more polymers to form the entire length thereof. Each of the modular luminaires 100 may be in the range of about one to three feet in the y-dimension by about one to three inches in the x-dimension. Further, each optical waveguide may be about one foot in the y-dimension and about six inches in the x-dimension. However, dimensions of the optical waveguides 104 and the elongate housings 102 may be subject to modification, and further, may be customized to fit different suspended luminaire configurations, or the other luminaire configurations discussed hereinbelow. The single extrusion elongate housing 102 may be painted any desired color or coated with a variety of reflective materials.

Referring now to FIG. 8, elongate housing 102e is operatively coupled to an optical waveguide 140 with an interior coupling portion 142 to form another embodiment of a modular luminaire 144. The interior coupling portion 142 may be disposed near a middle of the optical waveguide 140 and/or offset nearer one of first and second ends 146a, 146b thereof. The modular luminaire 144 depicted in FIG. 8 may be coupled with other modular luminaires 144, 100 to form modular luminaire light systems/luminaires similar to that shown and described with reference to FIG. 6B, save the relative location and orientation of the optical waveguide(s) 140, 104.

Referring now to FIGS. 9A and 9B, an example embodiment of a modular luminaire lighting system 150 is formed by three edge-lit modular luminaires 100f, 100g, 100h. Each of the modular luminaires 100f-h comprises a corresponding elongate housing 102f-h. FIG. 9A depicts a modular luminaire lighting system 150a with corresponding optical waveguides 104f-h coupled to the elongate housings 102f-h. The end optical waveguides 104f, 104h comprise the extraction feature patterns 120a (FIG. 1), while the middle optical waveguide 104g comprises the extraction feature pattern 120c (FIG. 5B). FIG. 9B depicts a modular luminaire lighting system 150b comprising three optical waveguides 104i-k coupled to the elongate housings 102f-h. These optical waveguides 104i-k comprise the extraction feature pattern 120a (FIG. 1) for general lighting purposes but with varying directionality so as to produce a desirable illumination pattern.

The modular illumination lighting systems 150a, 150b of FIGS. 9A and 9B comprise additional structural support components 152a, 152b, 152c, 152d for connecting and supporting the respective optical waveguides 104f-h, 104i-k. The structural support components 152a-152d facilitate connections between the optical waveguides 104f-h. Further, the structural support components 152a, 152b, 152c, 152d may be attached to the respective elongate housings 102f-h to form one or more frame portions 154a, 154b, 154c. Each of the one or more frame portions 154a-c support the associated optical waveguides 104f-h, 104i-k along more than one edge thereof. As noted hereinabove, the elongate housings 102*f-h* of this example embodiment may fit, clip, and/or snap together by male and female ports of adjacent elongate housings.

Figure 10B:
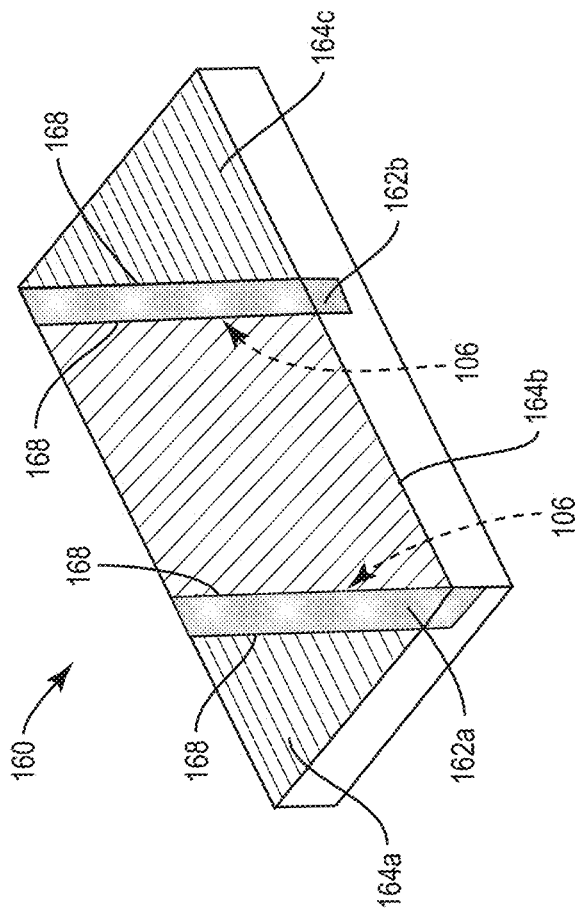
FIGS. 10A and 10B depict an example luminaire comprising a plurality of optical waveguides comprising differing shapes and coupled one to the next.
Figure 10A:
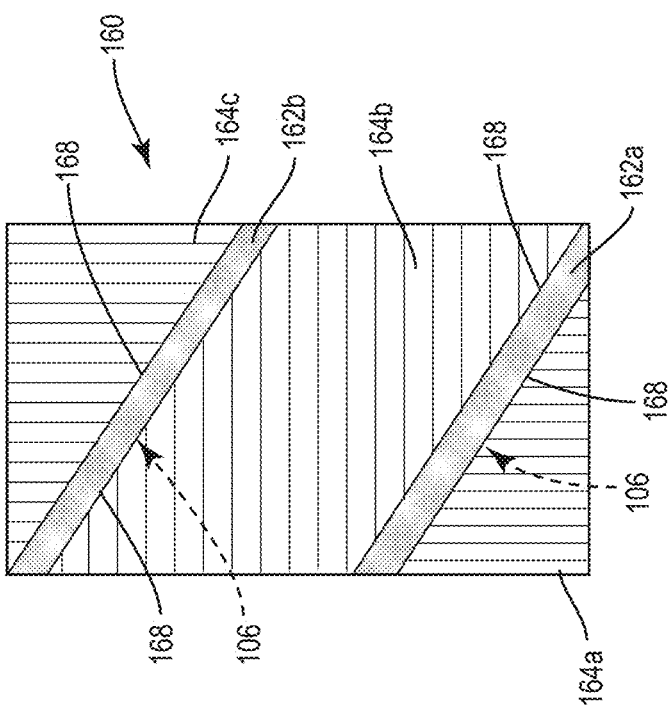

A generally rectangular example embodiment of a modular luminaire lighting system 160 is illustrated in FIGS. 10A and 10B. In these example embodiments, elongate housings 162*a*, 162*b* are disposed at an angle relative one or more exterior edge of the optical waveguide(s) 164*a*, 164*b*, 164*c*. The elongate housings 162*a*, 162*b* traverse an interior portion 166 of the modular luminaire lighting system 160. Accordingly, the optical waveguides 164*a*, 164*b*, 164*c* are edge lit from interior edges 168 thereof rather than along exterior perimeter(s) of the respective waveguides 164*a*, 164*b*, 164*c*. The example embodiment of FIGS. 10A and 10B may omit housing and/or support structures along the exterior perimeter of the waveguides 164*a*, 164*b*, 164*c* and, therefore, the modular luminaire lighting system 160. The exposed edges of the waveguides 164*a*, 164*b*, 164*c* may provide a unique aesthetic effect or appearance of the modular luminaire lighting system 160. For example, light my exit the waveguides 164*a*, 164*b*, 164*c* through the exterior perimeter(s) thereof. Such an effect may cause the modular luminaire lighting system 160 to glow or otherwise illuminate from edge surfaces. Further, disposing the elongate housings 162*a*, 162*b* at an angle relative the exterior perimeter(s) of the waveguides 164*a*, 164*b*, 164*c* may be aesthetically desirable. The LED modules 106 may be disposed along one or more sides of the elongate housings 162*a*, 162*b* so as to introduce light into one or more of the optical waveguides 164*a*, 164*b*, 164*c*.

Figure 11B:
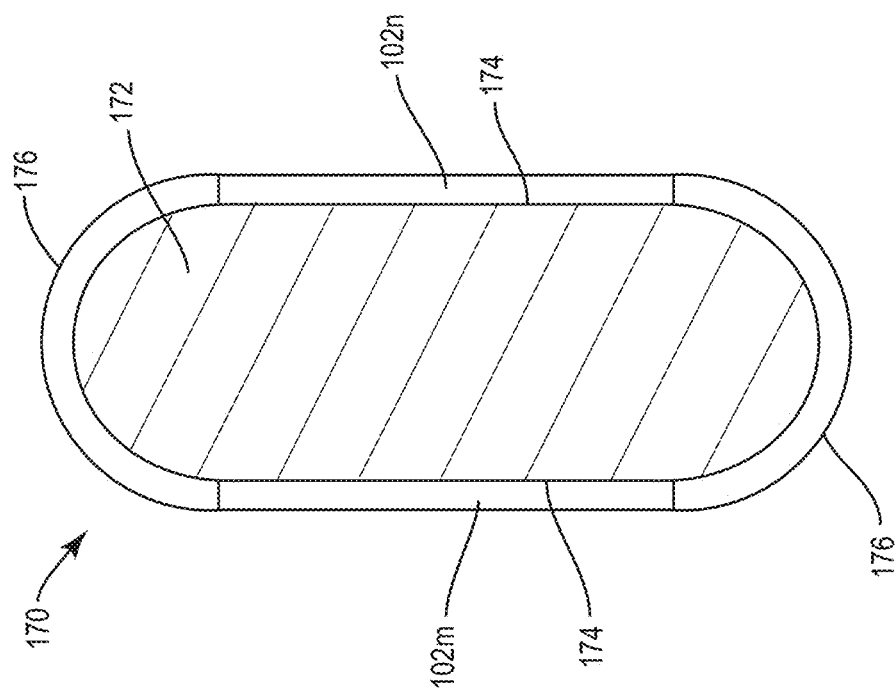
FIGS. 11A and 11B depict an example luminaire comprising one or more optical waveguides comprising an overall racetrack shape.
Figure 11A:
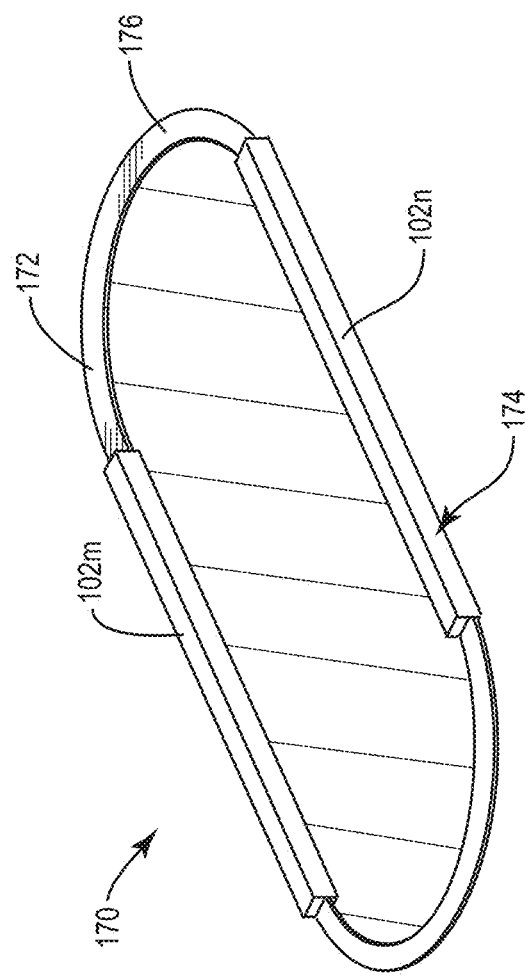

Referring now to FIGS. 11A and 11B, a generally curved, elliptical, racetrack, and/or oval example embodiment of a modular luminaire lighting system 170 is illustrated. The lighting system 170 may comprise one or more arcuate optical waveguide 172 comprising a combination of straight and curved edges 174, 176. The curved modular luminaire lighting system 170 may further comprise first and second elongate housings 102*m*, 102*n* disposed along the straight edges 174 of the arcuate optical waveguide 172. The first and second elongate housings 102*m, n* direct light into the arcuate optical waveguide 172. Similar to the operation of the optical waveguide(s) 102 discussed hereinabove, the arcuate optical waveguide 172 may comprise the extraction features 110 forming an extraction feature pattern 120*e* for directing and distributing light through one or more surfaces 178*a*, 178*b* of the arcuate optical waveguide 172. In an example embodiment, the curved modular luminaire lighting system 170 may be suspended from a ceiling and/or mounted as a wall sconce. The curved edges 176 of the arcuate optical waveguide 172 may emit light therefrom, where the waveguide 172 is not obscured by placement of the first and second elongate housings 102*m, n*. The emission of light from the curved edge surfaces 176 of the arcuate optical waveguide 172 as well as the overall curved shape of the curved modular luminaire lighting system 170 may provide desirable aesthetic appeal for particular applications.

In FIGS. 12A and 12B, a generally triangular example embodiment of a modular luminaire lighting system 180 is illustrated. The triangular modular luminaire lighting system 180 comprises first, second, and third elongate housings 102*p*, 102*q*, 102*r* disposed about a generally triangular optical waveguide 182. In this example embodiment, the LED elements and/or modules 106 may be disposed in each of the elongate housings 102*p, q, r*, and/or only within a selection of the elongate housings 102*p, q, r*. The LED elements and/or modules 106 introduce light into the triangular optical waveguide 182 through one or more edge surfaces 184 of the triangular optical waveguide 182. In an example embodiment, the elongate housings 102*q*, 102*r* may be omitted such that the triangular optical waveguide 182 is mounted from and/or extends from the single elongate housing 102*p*. Similar to the operation of the optical waveguide(s) 102 discussed hereinabove, the triangular optical waveguide 182 may comprise the extraction features 110 forming an extraction feature pattern 120*f* for directing and distributing light through one or more surfaces 186*a*, 186*b* of the triangular optical waveguide 182. In an example embodiment, the triangular modular luminaire lighting system 180 may be suspended from a ceiling and/or mounted as a wall sconce. The inclusion or omission of the elongate housings 102*p, q, r* may be customizable to achieve a desirable appearance and/or aesthetic appeal for particular applications.

FIG. 13A depicts a plurality of the triangular optical waveguides 182*a, b, c, d, e, f*, which may be operatively coupled to comprise a generally trapezoidal example embodiment of a modular luminaire lighting system 190 illustrated in FIG. 13B. Each of the triangular optical waveguides 182*a-f* in FIGS. 13A and 13B is associated with an elongate housing 102*s*-102*x*. The LED elements and/or modules 106 may be disposed in each of the elongate housings 102*s*-102*x*. Each of the triangular optical waveguides 182*a-f* in combination with the respective elongate housings 102*s*-102*x* comprise generally triangular modular luminaire lighting systems 200. The trapezoidal modular luminaire lighting system 190 may be formed from a plurality of the triangular modular luminaire lighting systems 200. The example embodiment of FIG. 13B depicts the trapezoidal modular luminaire lighting system 190 as comprising six of the triangular modular luminaire lighting systems 200. Embodiments of the trapezoidal modular luminaire lighting system 190 may comprise more or fewer of the triangular luminaire lighting systems 200. In this way the size and shape of the trapezoidal modular luminaire lighting system 190 may be customized. The trapezoidal modular luminaire lighting system 190 may form an isosceles trapezoid, if, for example, five triangular modular luminaire lighting systems 200 are included. In a further example, the trapezoidal modular luminaire lighting system 190 may form a parallelogram, if six triangular modular luminaire lighting systems 200 are included as shown in FIG. 13B. The number and size of the triangular modular lighting systems 200 may be further customizable in order to provide the desired general size and shape of the trapezoidal modular luminaire lighting system 190. The elongate housings 102*s*-102*x* of the triangular modular lighting systems 200 operatively couple through male and female power ports as described hereinabove with reference to FIGS. 7A-7C.

Referring now to FIGS. 14A and 14B, a generally square example embodiment of a modular luminaire lighting system 210 is depicted. The square modular luminaire lighting system 210 comprises first and second triangular optical waveguides 212*a*, 212*b*, similar to the triangular waveguides 182*a-f* of the trapezoidal modular luminaire lighting system 190 (FIGS. 13A and 13B). Further, in this example embodiment, elongate housing 214 is disposed at an angle relative one or more exterior edge of the triangular optical waveguides 212*a*, 212*b*. The elongate housing 214 traverses an interior portion of the square modular luminaire lighting system 210. Accordingly, the triangular optical waveguides 214*a*, 214*b* are edge lit from interior edges 218 thereof rather than along exterior perimeter(s) of the respective waveguides 212*a*, 212*b*. FIGS. 15A and 15B depict a circular example embodiment of a modular luminaire lighting system 220. In the circular modular luminaire lighting system 220, first and second half circle optical waveguides 222a, 222b are operatively coupled to an elongate housing 224 disposed across an interior portion of the circular modular luminaire lighting system 220. Accordingly, the circular optical waveguides 222a, 222b are edge lit from interior edges 228 thereof rather than along exterior perimeter(s) of the respective waveguides 222a, 222b.

Figure 16A:
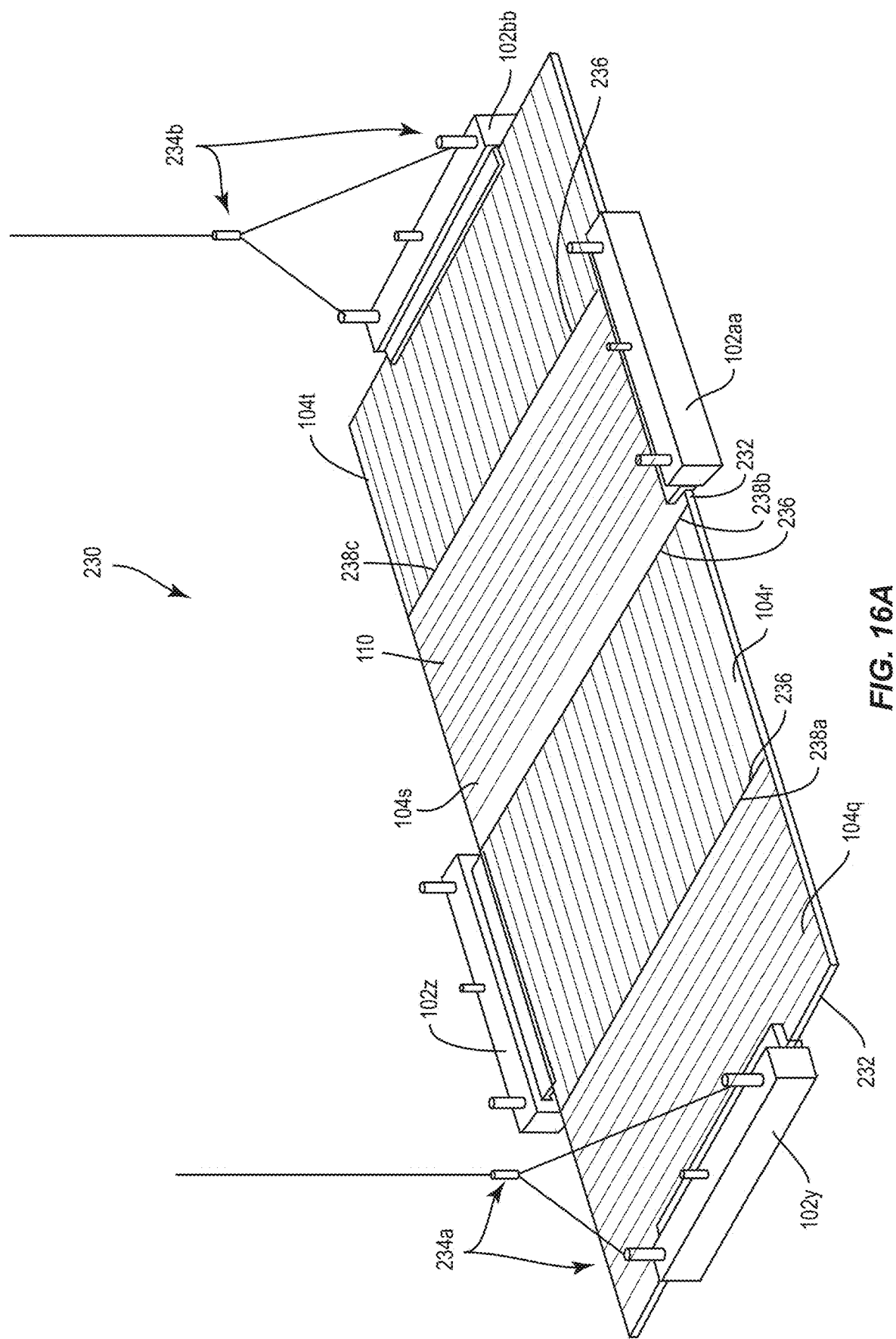
FIG. 16A is an isometric view of an example suspended luminaire comprising a plurality of optical waveguides coupled one to the next.
Figure 16B:
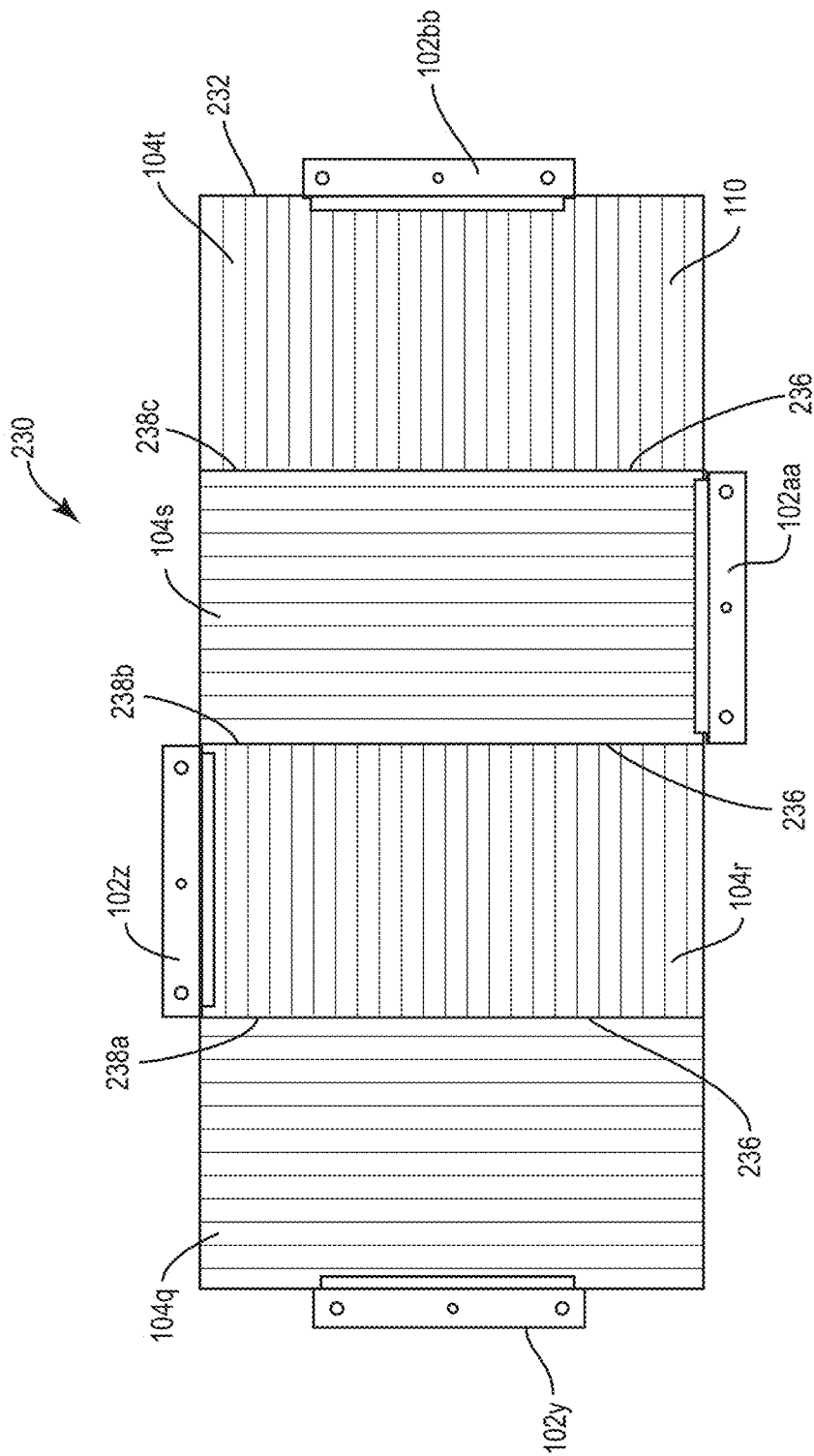
FIG. 16B is a plan view of the example luminaire of FIG. 16A.

FIGS. 16A and 16B depict first, second, third, and fourth rigid optical waveguides 104q, 104r, 104s, 104t arranged to form an edge lit, suspended modular luminaire lighting system 230. Elongate housings 102y, 102z, 102aa, 102bb, are disposed along a perimeter edge surface 232 of the first to fourth rigid optical waveguides 104q, 104r, 104s, 104t. The LED elements and/or modules 106 may be disposed in the elongate housings 102y, z, aa, bb such that light is directed into the edge surfaces 232 of the optical waveguides 104q-t. Similar to the operation of the optical waveguide(s) 104 discussed hereinabove, the rigid optical waveguides 104q-t may comprise the extraction features 110 forming the extraction feature patterns 120a-d as depicted in FIGS. 1 and 5A-5C. In an example embodiment, the suspended modular luminaire lighting system 230 may be suspended from a ceiling by first and second suspension assemblies 234a, 234b. The one or more mounting or suspension assemblies 234a, 234b may mechanically connect the suspended modular luminaire lighting system 230 to a ceiling, pole, post, joist, and/or any other structurally suitable overhead mounting element(s). Alternatively, the mounting or suspension assemblies 234a, 234b may connect the suspended modular luminaire lighting system 230 to one or more wall(s), pole(s), post(s), stud(s), or any other structurally suitable horizontal mounting element(s). Electrical connections may be made in any manner to the luminaire, including through the suspension assemblies 234a, 234b.

The edge surfaces 232 of the rigid optical waveguides 104q, 104r, 104s, 104t may emit light therefrom, where not obscured by placement of the elongate housings 102y, 102z, 102aa, 102bb. Further, the optical waveguides 104q, 104r, 104s, 104t may operatively couple to one another along interior edge surfaces 236 thereof to form interior connection points 238a, 238b, 238c. The interior connection points 238a, 238b, 238c may provide a desirable aesthetic appeal due to the omission of additional, non-light emitting structural components between the optical waveguides 104q, 104r, 104s, 104t. Further, the rigid optical waveguides 104q, 104r, 104s, 104t may create a light path between and amongst the rigid optical waveguides 104q, 104r, 104s, 104t. Light travelling within the rigid optical waveguides 104q, 104r, 104s, 104t may move from one waveguide to the next through the interior connection points 238a, 238b, 238c. The suspended modular luminaire lighting system 230 may comprise a customizable size and shape. One or more of the rigid optical waveguides 104q, 104r, 104s, 104t may be omitted and/or additional rigid optical waveguides may be included in the suspended luminaire lighting system 230. In customizable embodiments, the rigid optical waveguides 104q, 104r, 104s, 104t may be connected and disconnected at the interior connection points 238a, 238b, 238c. Still further, example embodiments of the suspended luminaire lighting system 230 may comprise L-shape, T-shape, and/or other shapes with one or more arms extending therefrom.

Referring now to FIGS. 17A and 17B, an adjustable waveguide luminaire 300 is depicted with first and second adjustable optical waveguides 302a, 302b. The first and second optical waveguides 302a, 302b are disposed in a frame housing 304. The LED elements and/or modules 106 are disposed within the frame housing 304 such that light is directed into the first and second optical waveguides 302a, 302b. The dimensions of the frame housing 304 and the adjustable optical waveguides 302 may be subject to modification, and further, may be customized to fit different wall sconce and/or suspended fixture sizes and applications. As in the other embodiments disclosed herein, the frame housing 304 may include, among other things, one or more of driver circuitry, light emitting diode(s), control circuitry, sensor(s), power circuitry, circuit board(s), or other components.

Further, as with other contemplated example embodiments, the optical waveguides 302a, 302b are modular and interchangeable, such that each may be switched for an alternative waveguide having different extraction features and/or may be replaced with relative ease. Therefore, the waveguides 302a, 302b may be easily changed and selected to produce customizable overall illumination patterns for the adjustable waveguide luminaire 300 according to parameters suitable for a particular indoor lighting application or simply according to desired characteristics.

The adjustable optical waveguides 302a, 302b may be operatively coupled with the frame housing 304 by one or more pivot/connection points 306 for each of the adjustable optical waveguides 302a, 302b. The pivot/connection points 306 may provide for rotation and/or free movement of the respective adjustable optical waveguides 302a, 302b thereabout. Additionally, the LED elements/modules 106 may be aligned with the one or more pivot/connection points 306 such that light is introduced into the respective adjustable optical waveguide 302a, 302b through the associated one or more pivot/connection points 306.

In an example embodiment, the adjustable optical waveguide 302a is operatively coupled to the frame housing 304 by first and second pivot/connection points 306a, 306b. The adjustable optical waveguide 302a may comprise a neutral position that is in alignment with the frame housing 304. From the neutral position, the adjustable optical waveguide 302a may move/adjust/pivot at the first and second pivot/connection points 306a, 306b such that a free end 308 of the adjustable optical waveguide 302a moves out of alignment with the frame housing 304 and the adjustable optical waveguide 302a is disposed at an angle relative a plane defined by the frame housing 304. The free end 308 of the adjustable optical waveguide 302a may move to either side of the plane defined by the frame housing 304. Also in example embodiments, the adjustable optical waveguide 302a may be operatively coupled to the frame housing 304 by more or fewer pivot/connection points 306, including a single pivot/connection point 306. In an example embodiment with a single pivot/connection point, the adjustable optical waveguide 302a may pivot in two directions thereby extending out and away from the frame housing 304. The second adjustable optical waveguide 302b may operate in any of the manners described hereinabove with respect to the first adjustable optical waveguide 302a. Additionally, in example embodiments, the adjustable waveguide luminaire 300 may comprise more or fewer of the adjustable optical waveguides 302. The specifications of a particular lighting application may be used to dictate the size of the adjustable waveguide luminaire 300, in the spirit of those embodiments depicted herein, as well as the number of optical waveguides disposed thereabout.

Figures 18A, 18B:
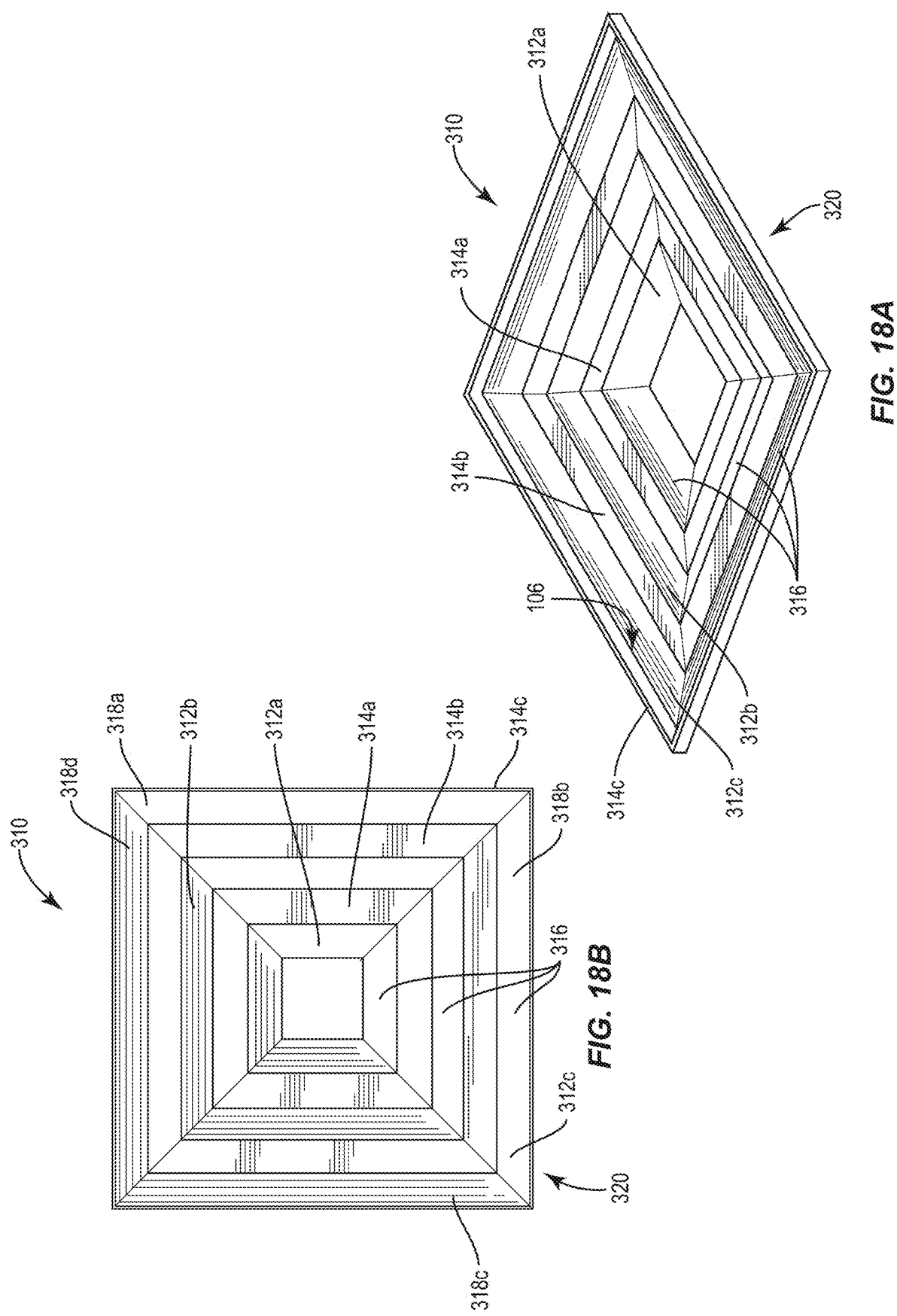
FIG. 18A is a plan view of an example luminaire with one or more waveguides performing a non-lighting function.
FIG. 18B is an isometric view of the example luminaire of FIG. 18A.

With reference to FIGS. 18A and 18B, an apparatus forming a combined luminaire and non-lighting fixture 310 is shown and described. Specifically, the non-lighting fixture incorporates waveguides and LED elements therein. An example embodiment of the apparatus 310 comprising a non-lighting function, shown in FIGS. 18A and 18B, is a ventilation fixture wherein one or more optical waveguides 312*a*, 312*b*, 312*c* replace air directing components of the ventilation fixture that would otherwise direct air flow as the air exits a conventional ventilation fixture. Thereby the one or more optical waveguides 312*a*, 312*b*, 312*c* perform a non-lighting function by directing air flow in addition to emitting light. Also in this example embodiment, the LED elements and/or modules 106 may be incorporated into other air directing components that are not replaced by the optical waveguides 312*a*, 312*b*, 312*c*. Accordingly, the other air directing components may be air directing housings 314*a*, 314*b*, 314*c*. The LED elements and/or modules 106 housed within one or more of the air directing housings 314*a*, 314*b*, 314*c* introduce light into the one or more optical waveguides 312*a*, 312*b*, 312*c*. The light introduced into the one or more optical waveguides 312*a-c* travels through the optical waveguide(s) 312*a-c* by TIR and is emitted from one or more surfaces, such as an outward facing surface 316, of each of the waveguides 312*a*, 312*b*, 312*c*. In example embodiments, more or fewer optical waveguides may replace more or fewer air directing components of the non-lighting fixture. Further, the one or more optical waveguides 312*a*, 312*b*, 312*c* shown in the example embodiment of FIGS. 18A and 18B may instead be separated into a plurality of elongate optical waveguides. For example, the outer waveguide 312*c* may comprise elongate optical waveguides 318*a*, 318*b*, 318*c*, 318*d* arranged to form a square and/or rectangular optical waveguide.

In example embodiments, the overall shape of the combination fixture 310 may be different, and, therefore, the shapes and sizes of the optical waveguides 312, 318 may differ accordingly. For example, the combination fixture 310 may be a circular ventilation fixture requiring one or more circular optical waveguides and one or more circular air directing housings. The combination fixture 310 may also be generally oval, triangular, elongate rectangular, and/or shapes and sizes suitable for desired lighting and/or ventilating applications. As with other embodiments described herein, the optical waveguides 312*a-c* and/or 318*a-d* are modular and interchangeable. Further, the optical waveguides 312, 318 in combination with the associated air directing housings 314 may form air directing luminaires 320 that are customizable and interchangeable such that one may be switched for another and/or such that the optical waveguides 312, 318 and/or the air directing luminaires 320 may be replaced with relative ease. Given that each optical waveguide 312, 318 of the combination fixture 310 may produce any customizable illumination pattern and that each optical waveguide 312, 318 and/or air directing luminaire 320 is modular, such waveguides/luminaires may be easily interchanged and selected to produce customizable overall illumination patterns for the combination fixture 310 according to parameters suitable for a given indoor/outdoor/enclosed lighting application or simply according to desired characteristics.

The combination fixture 310 may provide a unique and desirable aesthetic by combining the LED lighting elements into a non-lighting fixture. The combination fixture 310 may be formed by combining of LED lighting elements into ventilation fixtures, such as those used to provide heating and cooling air flow, ventilation hoods, crown molding, mirrors and/or other wall fixtures, and/or other suitable non-lighting ceiling or wall fixtures. The combination fixture 310 provides for unique illumination patterns, if desirable, and may provide for aesthetically pleasing incorporation of lighting elements into spaces that might otherwise warrant separate lighting fixtures.

In summary, in the contemplated example embodiments described herein throughout, the plurality of waveguides is disposed in and/or on the housing. A flex conductor or circuit boards are placed adjacent the top edges of the waveguides and the flex conductor or circuit boards are enclosed by the housing. The housing and waveguides are joined to form the luminaire and integrate the enclosure for the power supply, sensor, operating circuits, and wire connection area. The continuous flex conductor or circuit boards present the LEDs to the waveguide coupling members. The housing provides a unique aesthetic in which optical waveguides serve as substantial components, e.g., the sides and/or body of the luminaire. Material and costs associated with the luminaire are minimized. The design results in superior lighting with minimal glare. The optic feature of the fixture is integrated onto and/or into the main housing, which results in a more robust structure and aids in the sealing between components.

The waveguide optics allow high lumen output with low glare. This is accomplished by directing the light downward at an angle and spreading the illumination across a large area. The light from the LED's is pointed directly into each waveguide as opposed to being bounced off a reflective surface of a reflector (i.e., indirect illumination). This optical solution is more efficient than current indirect systems and allows the glare value to be adjusted by changing the illuminated area.

In an embodiment, each waveguide is made of optical grade acrylic and the LED's are optically coupled to the waveguide using a liquid silicone rubber ("LSR") member or other coupling member. The coupling member is shaped to serve as the entrance geometry for the optical system by directing light from the LED's directly into the waveguide.

If desired, the waveguides (with or without the optical coupling members) may be insert molded with the housing, thereby making the waveguide and housing a single piece and eliminating the need for seals between the waveguides and the housing. This reduces assembly time and makes for a more robust luminaire structure. In a specific version of the embodiment, a thermoplastic elastomer ("TPE") seal is molded onto the housing to seal the fixture and protect the LED's and related circuitry from the environment. In yet another embodiment, the TPE seal is molded onto a top plate or lid that is placed on top of the housing. In still further embodiments discussed herein, the fixture is not sealed and the waveguides thereof are modular and interchangeable, increasing the relative ease with which waveguides are replaced, such as if broken or worn, and/or overall illumination patterns are developed, customized, and/or changed.

The luminaire(s) can be used with several installation options (e.g., pendant, trunnion, junction box, pole, sconce). The housing also results in ease of installation because waveguides may be easily removed and/or replaced.

Any of the embodiments disclosed herein may include a power circuit that may further be used with light control circuitry that controls color temperature of any of the embodiments disclosed herein in accordance with viewer input such as disclosed in U.S. patent application Ser. No. 14/292,286, filed May 30, 2014, now U.S. Pat. No. 10,278, 250, entitled "Lighting Fixture Providing Variable CCT" by Pope et al. incorporated by reference herein.

Further, any of the embodiments disclosed herein may include one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, now U.S. Pat. No. 8,975,827, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the control circuitry includes at least one of a network component, an RF component, a control component, and a sensor. The sensor may provide an indication of ambient lighting levels thereto and/or occupancy within the illuminated area. Such sensor may be integrated into the light control circuitry and may cause the luminaire to adjust output lighting levels as a function of ambient light levels and/or detected motion.

INDUSTRIAL APPLICABILITY

In summary, the disclosed luminaire provides an aesthetically pleasing, sturdy, cost effective lighting assembly for use in lighting a large area such as an office or warehouse space, a smaller area such as a desk or hallway, and/or a combination of areas. The lighting is accomplished with reduced glare as compared to conventional lighting systems. Each lighting system comprises modular and/or interchangeable and/or replaceable luminaires and/or waveguides.

The extraction features disclosed herein efficiently extract light out of the waveguide. At least some of the luminaires disclosed herein are particularly adapted for use in installations, such as, replacement or retrofit lamps, outdoor products (e.g., streetlights, high-bay lights, canopy lights), and indoor products (e.g., downlights, troffers, a lay-in or drop-in application, a surface mount application onto a wall or ceiling, a suspended fixture, a wall sconce, etc.) preferably requiring a total luminaire output of at least about 800 lumens or greater, and, in some embodiments, a total luminaire output of at least about 7000 lumens, although the total luminaire output depends in part on the desired application. Further, the luminaires disclosed herein preferably have a color temperature of between about 2500 degrees Kelvin and about 6200 degrees Kelvin, and more preferably between about 2500 degrees Kelvin and about 5000 degrees Kelvin, and most preferably between about 4000 degrees Kelvin and about 5000 degrees Kelvin. Also, at least some of the luminaires disclosed herein preferably exhibit an efficacy of at least about 100 lumens per watt, and more preferably at least about 120 lumens per watt. Further, at least some of the optical coupling members and waveguides disclosed herein preferably exhibit an overall efficiency (i.e., light extracted out of the waveguide divided by light injected into the waveguide) of at least about 90 percent. A color rendition index (CRI) of at least about 70 is preferably attained by at least some of the luminaires disclosed herein, with a CRI of at least about 80 being more preferable. Any desired particular output light distribution, such as a butterfly light distribution, could be achieved, including up and down light distributions or up only or down only distributions, etc.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present disclosure, light is coupled into the optic, where primarily TIR is used for redirection and collimation. This coupling allows the full range of angular emission from the source, including high-angle light, to be re-directed and collimated, resulting in higher optical efficiency in a more compact form factor.

In at least some of the present embodiments, the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through the waveguide to minimize losses. In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

As in the present embodiments, a waveguide may include various combinations of mixing features, extraction features, and redirection features necessary to produce a desired light distribution. A lighting system may be designed without constraint due to color mixing requirements, the need for uniformity of color and brightness, and other limits that might otherwise result from the use of a specific light source. Further, the light transport aspect of a waveguide allows for the use of various form factors, sizes, materials, and other design choices. The design options for a lighting system utilizing a waveguide as described herein are not limited to any specific application and/or a specific light source.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of this disclosure (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A lighting system, comprising:
   a first luminaire comprising a first housing, a first power port disposed on a first end of the first housing, a first optical waveguide suspended from the first housing, and one or more first light emitting diodes (LEDs) disposed adjacent the first optical waveguide;
   a second luminaire comprising a second housing, a second power port disposed on a second end of the second housing, a second optical waveguide suspended from the second housing, and one or more second LEDs disposed adjacent the second optical waveguide, wherein the first power port is electrically coupled to the second power port when the first housing is physically connected to the second housing; and
   LED driving circuitry and power circuitry for delivering power to at least one of the one or more first LEDs and the one or more second LEDs upon the physical connection of the first housing to the second housing.

2. The lighting system of claim 1, further comprising a third power port disposed on a third end of the first housing and a fourth power port disposed on a fourth end of the second housing.

3. The lighting system of claim 1, further comprising a plurality of additional luminaires wherein each of the plurality of additional luminaires comprises a respective housing comprising one or more associated power ports; and
   wherein each of the plurality of additional luminaires receives power from the first luminaire.

4. The lighting system of claim 3, wherein each of the plurality of additional luminaires receives power through at least one of the second luminaire and one other one of the plurality of additional luminaires.

5. The lighting system of claim 1, wherein the first and second luminaires are modular.

6. The lighting system of claim 1, further comprising at least one additional luminaire, wherein the at least one additional luminaire comprises a housing, an optical waveguide suspended from the housing, and one or more LEDs disposed adjacent the optical waveguide, and LED driving circuitry and power circuitry;
   wherein the first luminaire, the second luminaire and the at least one additional luminaire are modular; and
   wherein power is dispersed through the first luminaire, the second luminaire and the at least one additional luminaire by the coupled first and second power ports.

7. The lighting system of claim 6, wherein the first luminaire, the second luminaire and the at least one additional luminaire are interchangeable.

8. The lighting system of claim 6, wherein the first luminaire, the second luminaire and the at least one additional luminaire comprise one or more luminaires comprising a first size and shape and one or more other luminaires comprising a different size and shape.

9. The lighting system of claim 6 wherein the associated optical waveguides of the first luminaire, the second luminaire and the at least one additional luminaire are modular and interchangeable.

10. A lighting system comprising:
    a plurality of optical waveguides each comprising a light coupling end extending along an edge thereof; and
    a plurality of elongated housings, wherein each one of the plurality of optical waveguides is suspended from an associated one of the plurality of elongated housings and each one of the plurality of elongated housings comprises:
       one or more light emitting diodes (LEDs) on a printed circuit board (PCB) extending along a length of the one of the plurality of elongated housings and adjacent the light coupling end of the associated one of the plurality of optical waveguides; and
       at least one port at an end of the one of the plurality of elongated housings such that the plurality of elongated housings are directly mechanically connected to one another by the at least one port and the one or more LEDs in each one of the plurality of elongated housings are electrically coupled to one another.

11. The lighting system of claim 10, wherein the at least one port is at more than one end of the one of the plurality of elongated housings.

12. The lighting system of claim 10, wherein each of the plurality of optical waveguides and the associated one of the plurality of elongated housings comprise a plurality of luminaires; and wherein each of the plurality of luminaires is modular.

13. The lighting system of claim 12, wherein the plurality of luminaires are interchangeable.

14. The lighting system of claim 13, wherein the lighting system is scalable by addition and omission of one or more of the plurality of luminaires.

15. A lighting system, comprising:
    a first luminaire comprising a first housing, a first optical waveguide suspended from the first housing, one or more first light emitting diodes (LEDs) disposed adjacent the first optical waveguide, and one or more first power ports;
    a second luminaire comprising a second housing, a second optical waveguide suspended from the second housing, one or more second LEDs disposed adjacent the second optical waveguide, and one or more second power ports;
    a third luminaire comprising a third housing, a third optical waveguide suspended from the third housing, one or more third LEDs disposed adjacent the third optical waveguide, and one or more third power ports;
    wherein power is dispersed through the first luminaire, the second luminaire, and the third luminaire by coupling the one or more first power ports with the one or more second power ports and the one or more third power ports.

16. The lighting system of claim 15, further comprising LED driving circuitry and power circuitry for delivering power to at least one of the one or more first LEDs, the one or more second LEDs, and the one or more third LEDs upon a physical connection of the first housing to the second housing.

17. The lighting system of claim 15, wherein the first housing, the second housing, and the third housing are physically connected to one another.

18. The lighting system of claim 15, wherein the first luminaire, the second luminaire and the third luminaire are interchangeable.

19. The lighting system of claim 15, wherein the first luminaire, the second luminaire and the third luminaire comprise one or more luminaires comprising a first size and shape and one or more other luminaires comprising a different size and shape.

20. The lighting system of claim 15 wherein the associated optical waveguides of the first luminaire, the second luminaire and the third luminaire are modular and interchangeable.

* * * * *